United States Patent
Wada et al.

(10) Patent No.: US 10,228,571 B2
(45) Date of Patent: Mar. 12, 2019

(54) CAMERA APPARATUS AND FILTER UNIT

(71) Applicant: PANASONIC CORPORATION, Osaka (JP)

(72) Inventors: Jyouji Wada, Kanagawa (JP); Masahito Oka, Osaka (JP); Yoshihito Urashima, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 186 days.

(21) Appl. No.: 14/450,576

(22) Filed: Aug. 4, 2014

(65) Prior Publication Data

US 2015/0042818 A1     Feb. 12, 2015

(30) Foreign Application Priority Data

Aug. 6, 2013  (JP) .................................. 2013-163246
Aug. 7, 2013  (JP) .................................. 2013-163986
Jul. 10, 2014  (JP) .................................. 2014-142659

(51) Int. Cl.
*H04N 5/225*    (2006.01)
*H04N 5/232*    (2006.01)
(Continued)

(52) U.S. Cl.
CPC .......... *G02B 27/281* (2013.01); *G02B 5/208* (2013.01); *G03B 11/00* (2013.01); *G03B 17/14* (2013.01);
(Continued)

(58) Field of Classification Search
CPC .... G02B 27/281; G02B 5/208; G02B 26/023; G03B 17/12; G03B 17/14; H04N 5/2254; H04N 5/225; H04N 5/232
(Continued)

(56) References Cited

U.S. PATENT DOCUMENTS 2,399,658 A * 5/1946 Banker ................ G02B 26/023
                                              359/489.2
6,028,303 A * 2/2000 Suzuki ................ G02B 27/281
                                              250/225
(Continued)

FOREIGN PATENT DOCUMENTS

CN         1601307         3/2005
JP       06121323 A  *    4/1994
(Continued)

OTHER PUBLICATIONS

Machine translated English equivalent document is cited for JP06-121323, Yamashita, Apr. 1994.*
(Continued)

*Primary Examiner* — Albert Kir
(74) *Attorney, Agent, or Firm* — Greenblum & Bernstein, P.L.C.

(57) ABSTRACT

A camera apparatus includes: an imaging device; a polarization filter that transmits a polarization component; an infrared ray cut filter that cuts infrared rays; a first motor that rotates the polarization filter; and a second motor that inserts any one filter of the polarization filter and the infrared ray cut filter in an imaging region of the imaging device. The infrared ray cut filter cuts the infrared rays among light beams incident on the imaging device when the infrared ray cut filter is inserted in the imaging region by the second motor, and the polarization filter that is rotated by the first motor transmits the polarization component among the light beams incident on the imaging device when the polarization filter is inserted in the imaging region by the second motor.

8 Claims, 19 Drawing Sheets

(51) Int. Cl.
  *G02B 27/28* (2006.01)
  *G02B 5/20* (2006.01)
  *H04N 5/33* (2006.01)
  *G03B 11/00* (2006.01)
  *G03B 17/14* (2006.01)

(52) U.S. Cl.
  CPC ............. *H04N 5/2254* (2013.01); *H04N 5/33* (2013.01); *G03B 2217/002* (2013.01)

(58) Field of Classification Search
  USPC .......... 348/E5.028, 344, 164, 143, 360, 361; 396/448, 166; 350/407
  See application file for complete search history.

(56) References Cited

U.S. PATENT DOCUMENTS

| | | | | |
|---|---|---|---|---|
| 6,137,958 | A * | 10/2000 | Toyoda | G02B 27/281 396/166 |
| 8,827,578 | B2 | 9/2014 | Jikihara et al. | |
| 2005/0068456 | A1 | 3/2005 | Ohta et al. | |
| 2007/0291157 | A1* | 12/2007 | Ding | H04N 5/2254 348/360 |
| 2012/0320202 | A1* | 12/2012 | Qian | G02B 26/023 348/143 |
| 2013/0223834 | A1 | 8/2013 | Jikihara et al. | |
| 2014/0333767 | A1 | 11/2014 | Jikihara et al. | |
| 2015/0268534 | A1 | 9/2015 | Jikihara et al. | |

FOREIGN PATENT DOCUMENTS

| | | |
|---|---|---|
| JP | 9-266572 | 10/1997 |
| JP | 2000-162668 | 6/2000 |
| JP | 2003-259167 | 9/2003 |
| JP | 2011-017827 | 1/2011 |
| JP | 2012-027206 | 2/2012 |
| JP | 2012-103452 | 5/2012 |
| JP | 2012-185374 | 9/2012 |
| WO | 2013/047768 | 4/2013 |

OTHER PUBLICATIONS

International Search Report and Written Opinion in PCT/JP2014/071133, dated Feb. 16, 2015.

Japan Office Action in Japan Patent Application No. 2014-142659, dated Apr. 3, 2018, together with an English language translation thereof.

China Office Action in China Patent Application No. 201480044251.8, dated May 2, 2018, together with an English language translation thereof.

* cited by examiner

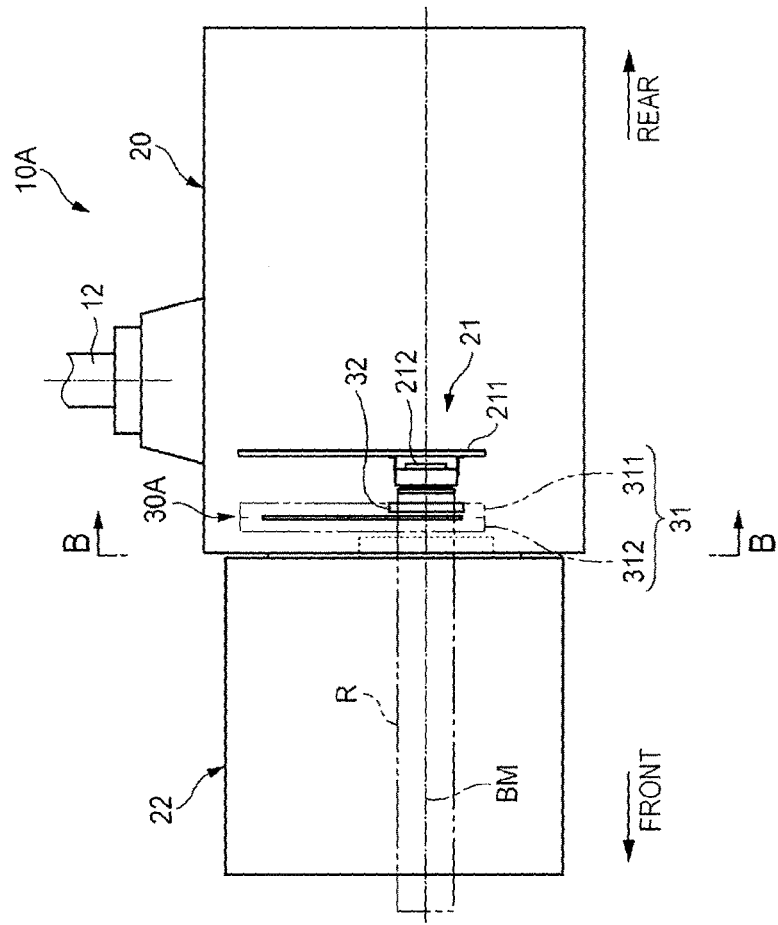
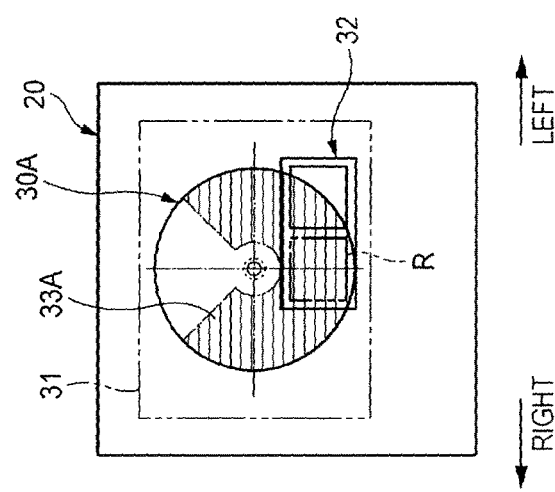

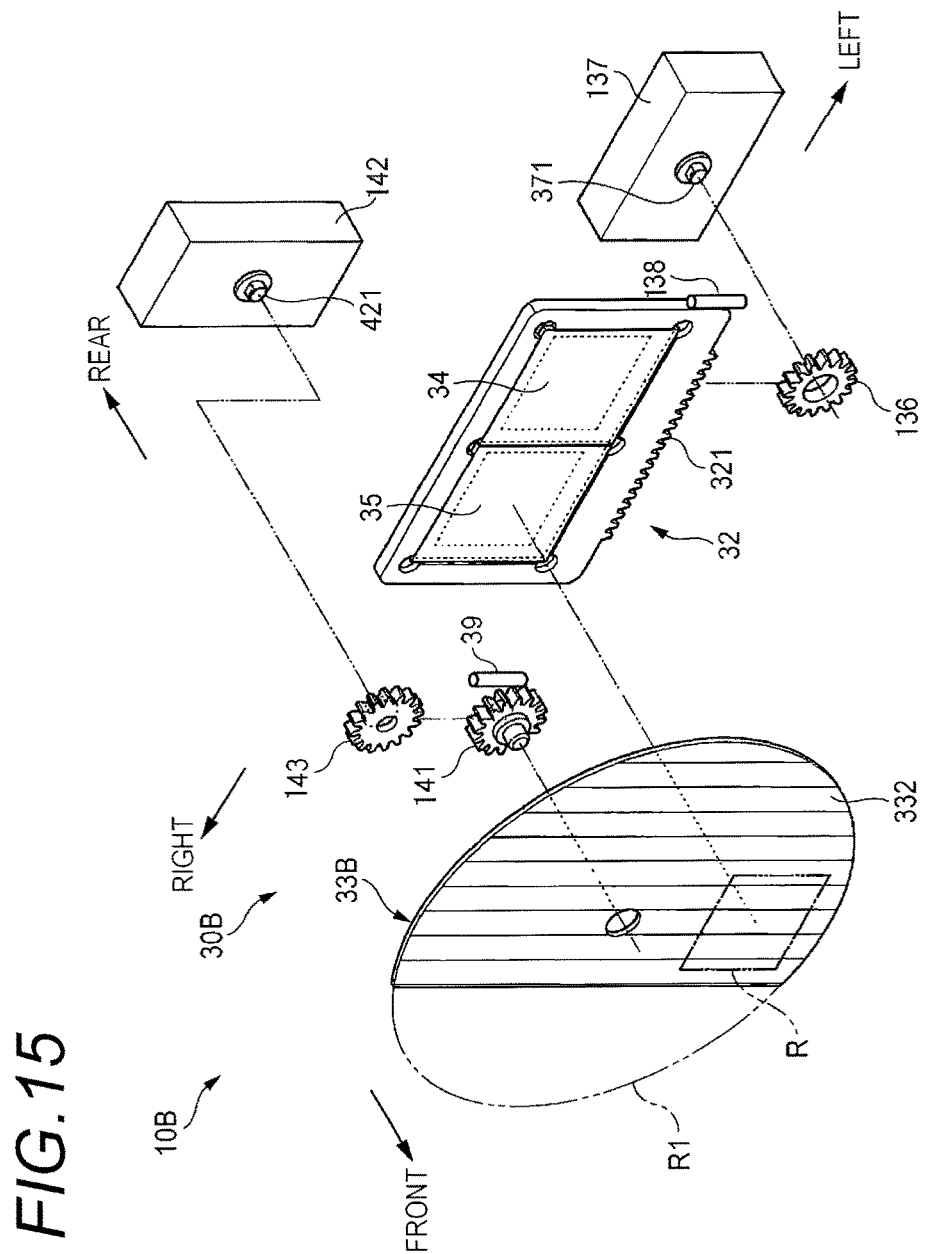

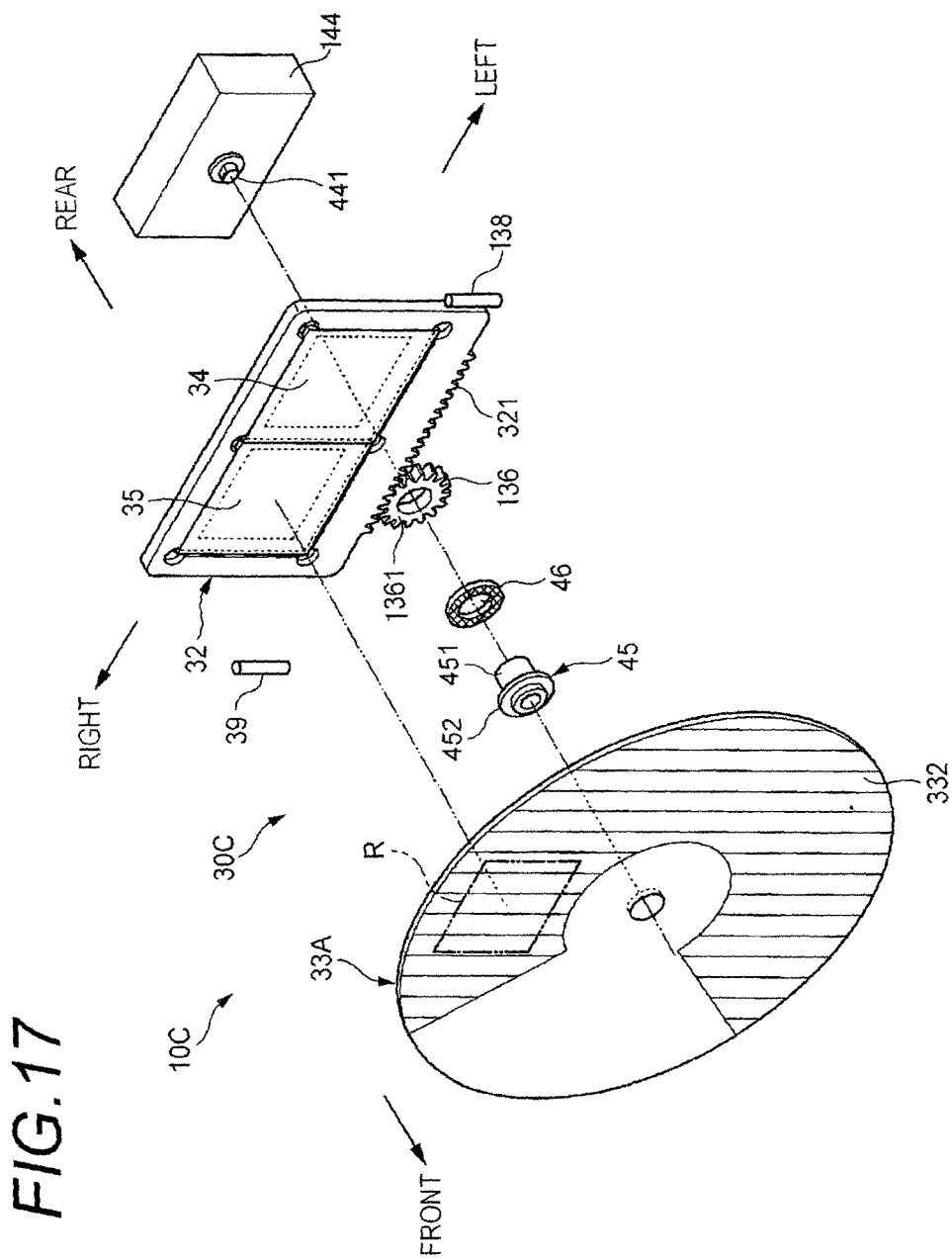

PRIOR ART

CAMERA APPARATUS AND FILTER UNIT

BACKGROUND

1. Field of the Invention

The present invention relates to a camera apparatus in which a polarization filter is capable of being turned on and off, and relates to a filter unit used for the camera apparatus.

2. Description of the Related Art

In the related art, as a camera apparatus, a camera for an outside vehicle monitoring apparatus in which a polarization filter is capable of being turned on and off has been known (for example, see JP-A-9-266572).

The camera apparatus (camera for an outside monitoring apparatus) described in JP-A-9-266572 is used to obtain external information by imaging an object outside the vehicle and performing image recognition of the imaged object in a vehicle such as an automobile.

As illustrated in FIG. 19, a camera apparatus 100 includes a CCD (charge coupled device) camera 101. The CCD camera 101 is provided with a CCD 102 as an imaging device and an objective lens system 103 is disposed on the front of the CCD 102 as an imaging optical system in which an object image is formed on an imaging surface of the CCD 102.

A polarization filter 104 that transmits only light beams having a predetermined polarization component and removes unnecessary light beams is removably provided in an optical path on the front side of the objective lens system 103.

Furthermore, a conversion lens 105 as a focus conversion lens that changes a focus distance of the objective lens system 103 is removably provided in the optical path (rear side of the objective lens system 103 in the view) of the objective lens system 103.

As described above, it is possible to prevent ghosting of a reflected image of an object inside the vehicle reflected in a front window from being incident on the objective lens system 103 and the CCD 102 by providing the polarization filter 104 in the CCD camera 101 as necessary.

Then, as illustrated in FIG. 20, the polarization filter 104 is fixed to a filter frame 107 including a worm wheel 106 in an outer peripheral portion and is rotatably mounted on a filter case 108 provided with the filter frame 107. Then, a rotation shaft 109 is provided in one end of the filter case 108 and an entirety of the filter case 108 rotates around the rotation shaft 109.

One set of bevel gears 110a and 110b connected to a drive unit such as a motor (not illustrated) are provided in the vicinity of the end portion of the filter case 108, a pinion 111 is provided in the other end of the bevel gear 110b, and the pinion 111 meshes with the worm wheel 106 of the filter frame 107. Here, a rotation shaft of the bevel gear 110a is disposed such that the shaft corresponds to the extension of the rotation shaft 109 of the filter case 108 and a rotation shaft of the bevel gear 110b is disposed perpendicularly with respect to the shaft of the rotation shaft 109.

According to such a rotation mechanism, the filter frame 107 is rotated by rotating the bevel gear 110a through the bevel gear 110b, the pinion 111, and the worm wheel 106, the polarization filter 104 can be positioned so as to have a desired polarization angle regardless of a rotational position of the filter case 108 itself, and the polarization component of the ghosting can be effectively removed.

Furthermore, the monitoring camera has a day-night switching function that performs imaging by disposing an infrared ray cut filter through which infrared rays do not pass in the front of the imaging device to match colors seen by human eyes for a bright period (daytime) and performs black-and-white imaging using the infrared rays by removing the infrared ray cut filter from the front of the imaging device for a dark period (night).

SUMMARY

As described above, in order to realize the monitoring camera having a polarization filter, it is necessary to mount three motors including a motor for inserting and removing an infrared ray cut filter, a motor for inserting and removing the polarization filter, and a motor for adjusting an angle of the polarization filter, and there is a problem that the apparatus is difficult to be miniaturized. Specifically, since there is a limited space between the lens and the imaging device, the miniaturization of the apparatus is difficult.

A non-limited object of the present invention is to provide a camera apparatus and a filter unit that realize an inserting and removing mechanism that performs the turning on and off a polarization filter and an inserting and removing mechanism of an infrared ray cut filter in a common mechanism.

A first aspect of the present invention provides a camera apparatus including: an imaging device; a polarization filter that transmits a polarization component; an infrared ray cut filter that cuts infrared rays; a first motor that rotates the polarization filter; and a second motor that inserts any one filter of the polarization filter and the infrared ray cut filter in an imaging region of the imaging device, wherein the infrared ray cut filter cuts the infrared rays among light beams incident on the imaging device when the infrared ray cut filter is inserted in the imaging region by the second motor, and the polarization filter that is rotated by the first motor transmits the polarization component among the light beams incident on the imaging device when the polarization filter is inserted in the imaging region by the second motor.

The camera apparatus may be configured by further including a first frame part that supports the polarization filter, wherein the first motor and the first frame part are separated from each other before the polarization filter is inserted in the imaging region of the imaging device by the second motor and the first motor and the first frame part are connected to each other and the polarization filter is rotated by the first motor through the first frame part when the polarization filter is inserted in the imaging region of the imaging device by the second motor.

The camera apparatus may be configured by further including a second frame part that supports at least the polarization filter and the infrared ray cut filter, wherein the second frame part is reciprocated by the second motor.

The camera apparatus may be configured by further including an idler pulley that is provided in the second frame part and meshes with a peripheral portion of the first frame part.

The camera apparatus may be configured so that the idler pulley meshes with a gear connected to the first motor when the polarization filter is inserted in the imaging region of the imaging device by the second motor.

The camera apparatus may be configured so that the first motor rotates the polarization filter before insertion of the polarization filter in the imaging region of the imaging device is completed by the second motor.

The camera apparatus may be configured so that the first motor rotates the polarization filter before the polarization filter overlaps the imaging region of the imaging device.

The camera apparatus may be configured so that the first motor rotates the polarization filter when at least a part of the polarization filter overlaps the imaging region of the imaging device.

The camera apparatus may be configured so that the first motor rotates the polarization filter after insertion of the polarization filter in the imaging region of the imaging device is completed by the second motor.

A second aspect of the present invention provides a filter unit including: a polarization filter that transmits a polarization component; an infrared ray cut filter that cuts infrared rays; a first motor that rotates the polarization filter; and a second motor that is adapted to insert any one filter of the polarization filter and the infrared ray cut filter in an imaging region of an imaging device, wherein the infrared ray cut filter is adapted to cut the infrared rays among light beams incident on the imaging device when the infrared ray cut filter is inserted in the imaging region by the second motor, and the polarization filter that is rotated by the first motor is adapted to transmit the polarization component among the light beams incident on the imaging device when the polarization filter is inserted in the imaging region by the second motor.

A third aspect of the present invention provides a camera apparatus including: an imaging device; a camera body in which the imaging device is built; a polarization filter that transmits light beams having a predetermined polarization component among light beams incident along an imaging axis of the imaging device; an infrared ray cut filter that transmits visible light; and a motor unit that rotates the polarization filter, wherein the motor unit rotates the polarization filter to insert and remove the polarization filter and to adjust a polarization angle of the polarization filter, and the motor unit reciprocates the infrared ray cut filter to allow the infrared ray cut filter to be inserted and removed with respect to the imaging axis of the imaging device.

The camera apparatus may be configured by further including: a gear rotatably connected to a rotation shaft of the motor unit; and a slide member interposed between the gear and the polarization filter.

A fourth aspect of the present invention provides a filter unit to be disposed between an imaging device and a lens unit, the filter unit including: a polarization filter that is adapted to transmit light beams having a predetermined polarization component among light beams incident along an imaging axis of the imaging device; an infrared ray cut filter that transmits visible light; and a motor unit that rotates the polarization filter, wherein the motor unit rotates the polarization filter to insert and remove the polarization filter and to adjust a polarization angle of the polarization filter, and the motor unit reciprocates the infrared ray cut filter to allow the infrared ray cut filter to be inserted and removed with respect to the imaging axis of the imaging device.

In the filter unit, the polarization filter, the infrared ray cut filter, and the transmitting filter are arranged along a direction orthogonal to the imaging axis of the imaging device, and are supported by a second frame part. The polarization filter is supported by a circular first frame part and the first frame part is supported by the second frame part. In the first frame part, a polarization direction is steplessly changed by the first motor. The second frame part reciprocates along an arrangement direction by the second motor. Therefore, it is possible to provide the camera apparatus and the filter unit having advantages in that the filters can be selectively used and a polarization angle of the polarization filter can be steplessly adjusted.

In addition, the filter unit is disposed between the imaging device and the lens of the camera apparatus. The filter unit includes the polarization filter that covers an imaging region of the imaging device and a motor unit that rotates the polarization filter so as to steplessly change the polarization direction around a line parallel to the imaging axis of the imaging device. Therefore, it is possible to provide the camera apparatus and the filter unit having advantages in that the polarization filter can be switched to be turned on and off, and the polarization angle can be steplessly adjusted.

BRIEF DESCRIPTION OF THE DRAWINGS

FIG. 11A is a side view of a camera apparatus and FIG. 11B is a front view of a camera body in position B-B in FIG. 11A.

FIG. 15 is an exploded perspective view illustrating a configuration of a filter unit in a camera apparatus of a fourth embodiment according to the present invention.

FIG. 17 is an exploded perspective view illustrating a configuration of a filter unit in a camera apparatus of a fifth embodiment according to the present invention.

DETAILED DESCRIPTION (First Embodiment)

Hereinafter, a camera apparatus and a filter unit according to a first embodiment will be described with reference to the drawings.

Figure 1:
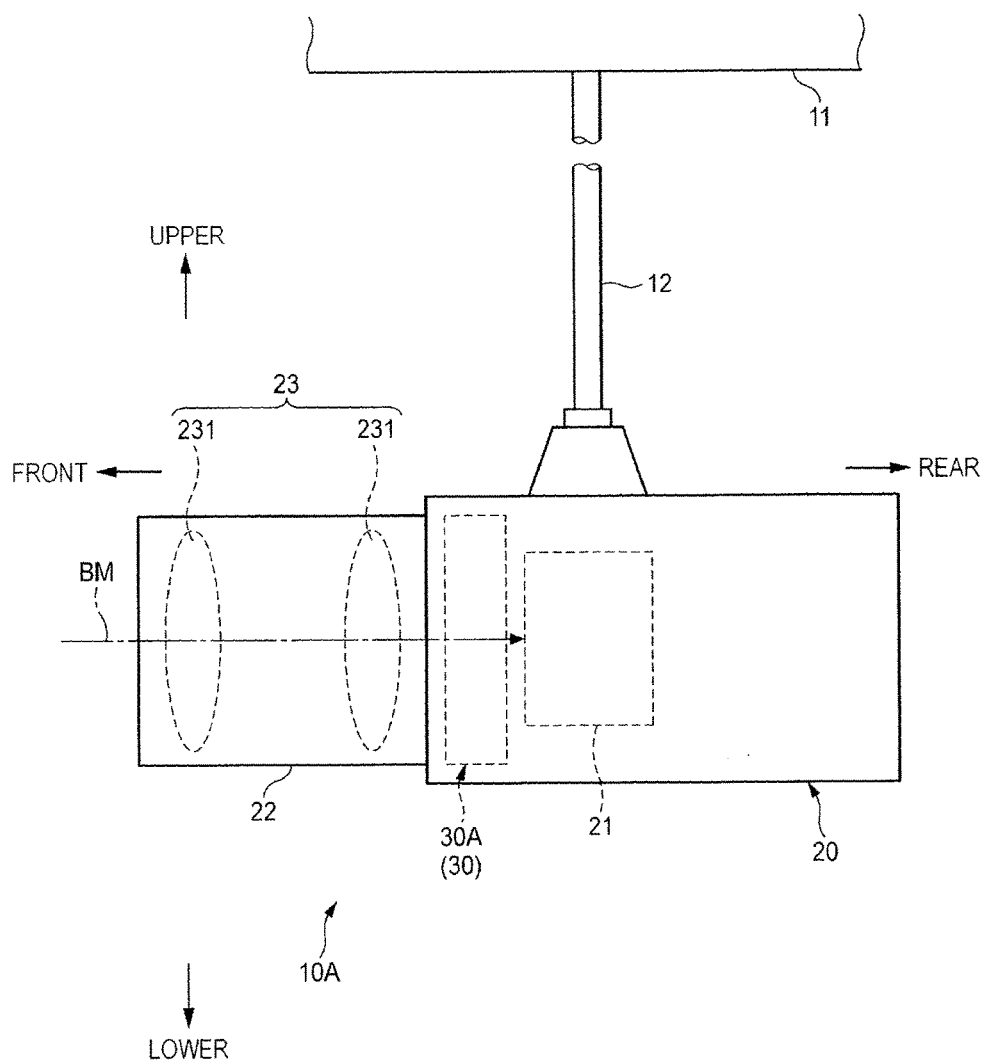
FIG. 1 is a side view of a camera apparatus of first and seventh embodiments according to the present invention.

As illustrated in FIG. 1, a camera apparatus 10A of the first embodiment can be used as a monitoring camera that is capable of imaging an object to be imaged by being suspended from a ceiling surface 11 by a suspension member 12.

Moreover, in the following description, on a side of the ceiling surface 11 is referred to as "upper" and a side opposite to the ceiling surface 11 is referred to as "lower". Furthermore, in the camera apparatus 10A, a side of the object to be imaged is referred to as "front" and a side opposite thereto is referred to as "rear".

The camera apparatus 10A includes a camera body 20 having, for example, a rectangular box shape suspended by the suspension member 12.

An imaging device unit 21 including an imaging device 212 (see FIG. 2B) is accommodated in the camera body 20. The imaging device unit 21 includes a substrate 211 mounted on the camera body 20 and the imaging device 212 is mounted on an imaging region (for example, a center portion of the substrate 211) in the substrate 211 (see FIGS. 2B and 3). Moreover, the imaging region refers to as a region (area) of a light flux incident on the imaging device 212.

Furthermore, a cylindrical lens unit 22 is mounted on a front side of the camera body 20. A lens group 23 in which a plurality of lenses 231 transmitting the light to the imaging device 212 are built in the lens unit 22 is accommodated in the lens unit 22.

A filter unit 30 is disposed between the imaging device unit 21 and the lens unit 22 on the front side of the imaging device unit 21 inside the camera body 20.

Figure 2:
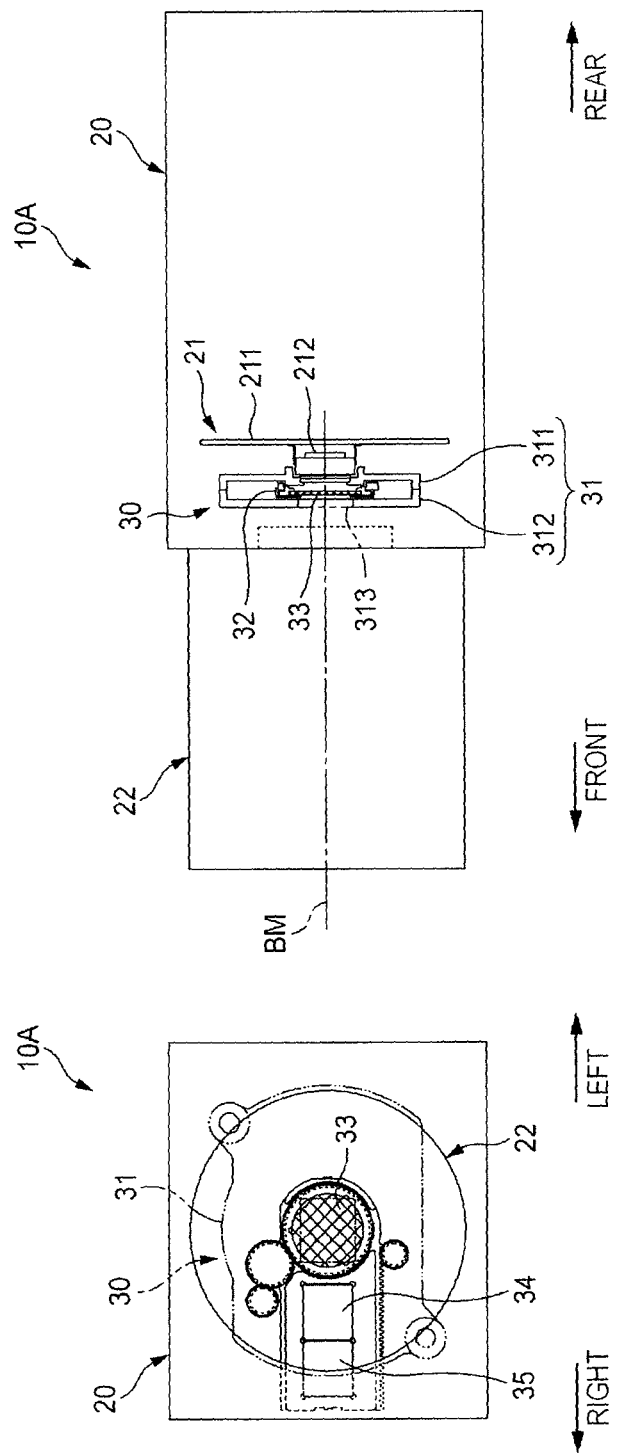
FIG. 2A is a side view of the camera apparatus and FIG. 2B is a front view when a filter frame is in a position of a polarization filter.
Figure 3:
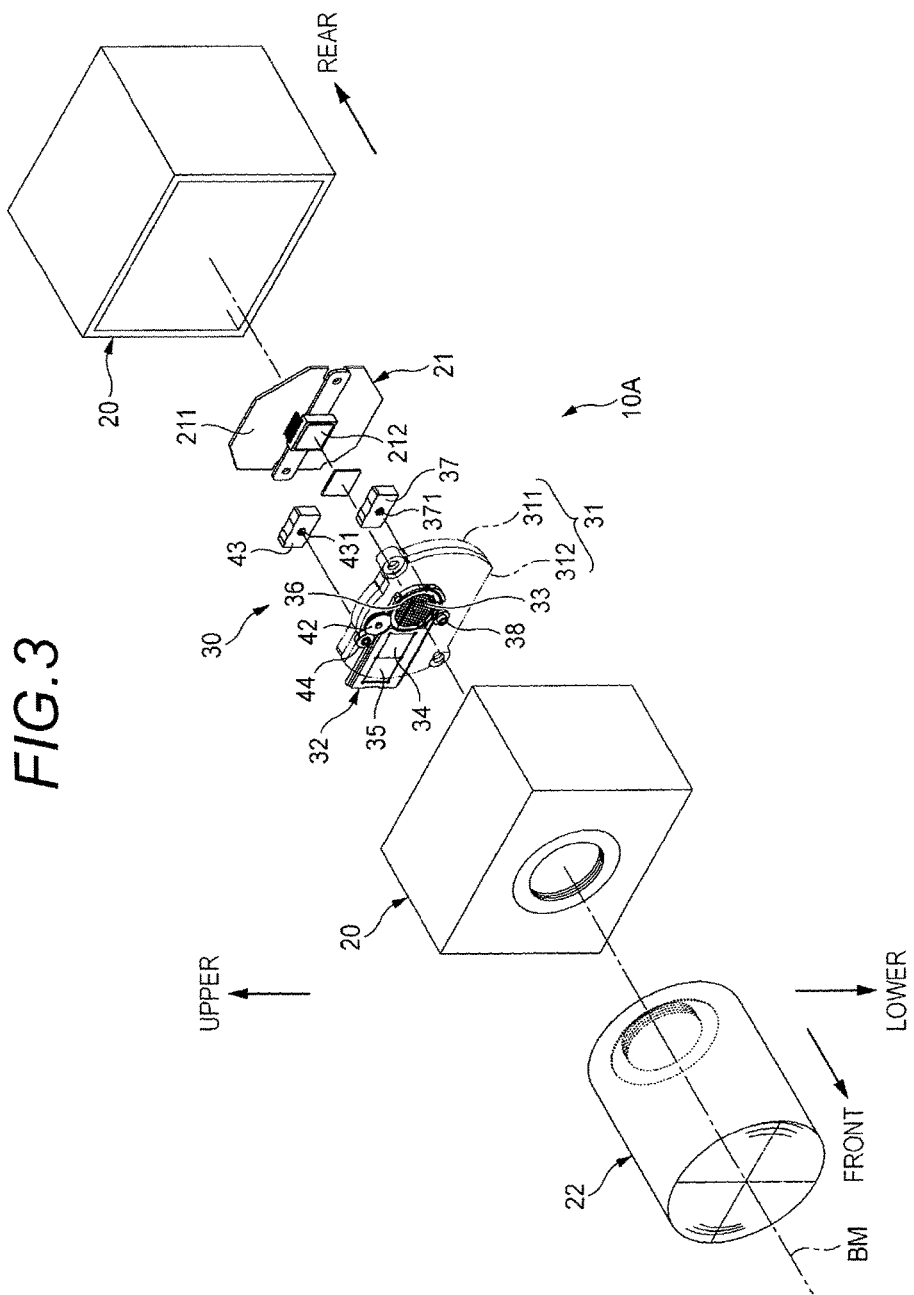
FIG. 3 is an exploded perspective view illustrating a case where the filter frame is in the position of the polarization filter.

As illustrated in FIGS. 2A, 2B, and 3, the filter unit 30 includes a box-shaped filter case 31 mounted on the camera body 20. The filter case 31 includes a rear case 312 on the rear side and a front case 311 on the front side. The front case 311 and the rear case 312 on the front and rear sides are provided with an opening 313 in a region corresponding to the imaging region of the imaging device 212.

A rectangular frame-shaped filter frame (a second frame part) 32 is provided inside the filter case 31 reciprocally in an arrangement direction (that is, a left and right direction in FIG. 2B) orthogonal to an imaging axis BM of the imaging device by a movement supporting mechanism (not illustrated).

Figure 4:
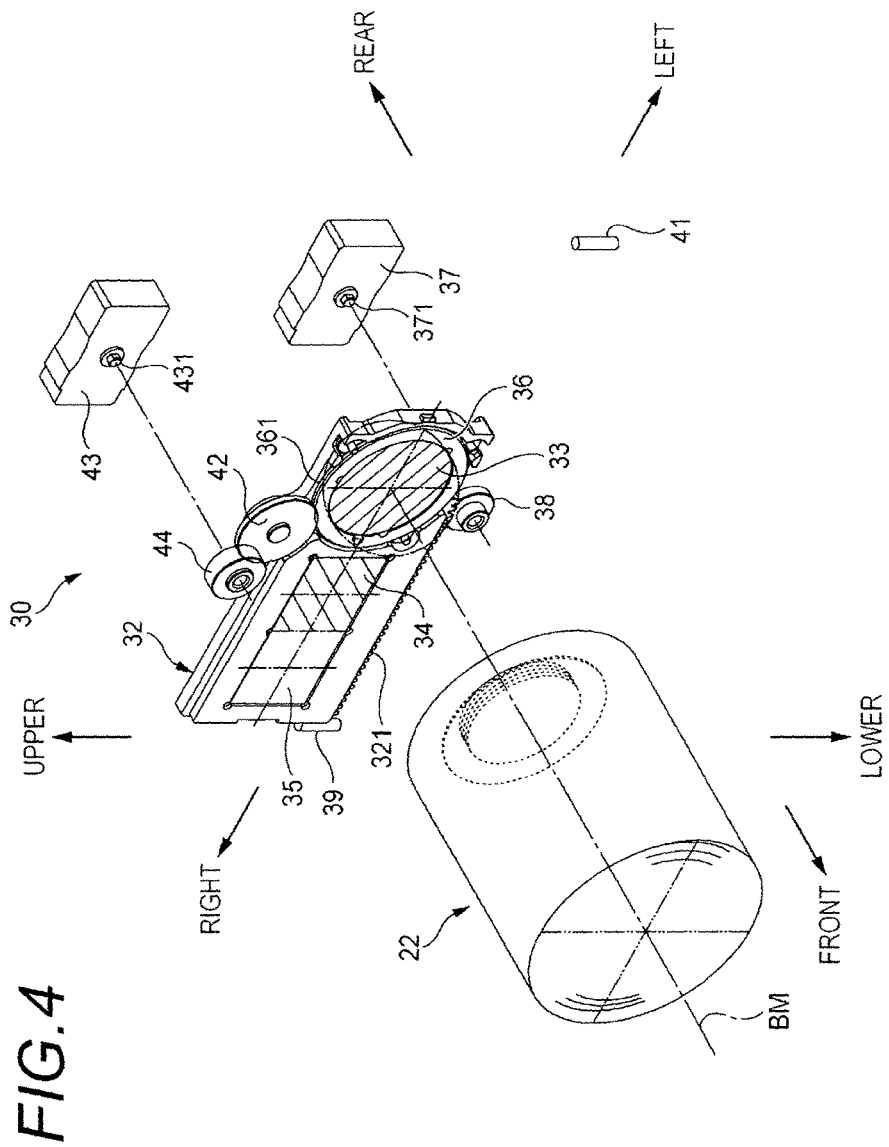
FIG. 4 is an exploded perspective view of a filter unit when the filter frame is in the position of the polarization filter.

As illustrated in FIGS. 3 and 4, the filter frame 32 is divided into three filter areas. A polarization filter 33, an infrared ray cut filter 34, and a transmitting filter 35 are fitted into the filter frame 32.

The polarization filter 33 transmits only light beams having a predetermined polarization component and removes unnecessary light beams by a rotation angle thereof. The infrared ray cut filter 34 does not transmit (reflect) the infrared rays and transmits only visible light. The transmitting filter 35 is a transparent glass and transmits all lights.

A rack gear 321 is formed on a lower surface of the filter frame 32. A second motor 37 for reciprocating the filter frame 32 is mounted on a rear surface of the rear case 312 of the filter case 31. A rotation shaft 371 of the second motor 37 protrudes to the inside of the filter case 31 by passing through the rear case 312. A pinion gear 38 is mounted on the rotation shaft 371 inside the filter case 31. The pinion gear 38 meshes with the rack gear 321 of the filter frame 32.

Therefore, since the pinion gear 38 rotates and the rack gear 321 is reciprocated by rotating the second motor 37 to the left and right, the filter frame 32 reciprocates to the left and right.

When performing the imaging, one of the polarization filter 33, the infrared ray cut filter 34, and the transmitting filter 35 is selectively positioned in the imaging region of the imaging device 212 by moving the filter frame 32 to the left and right.

As illustrated in FIG. 4, in order to position the polarization filter 33 that is disposed on the leftmost side in the filter frame 32, in the imaging region, for example, a right limit stopper 39 is provided on the right side of the filter frame 32 so that the filter frame 32 cannot be moved to the right any further. Then, the movement of the filter frame 32 to the right is forcibly prevented and the rotation of the second motor 37 is stopped, and the filter frame 32 is not moved from the position.

Thus, it is possible to position the polarization filter 33 to fit the imaging region. At this time, the position of the filter frame 32 is referred to as a polarization filter position.

Figure 6:
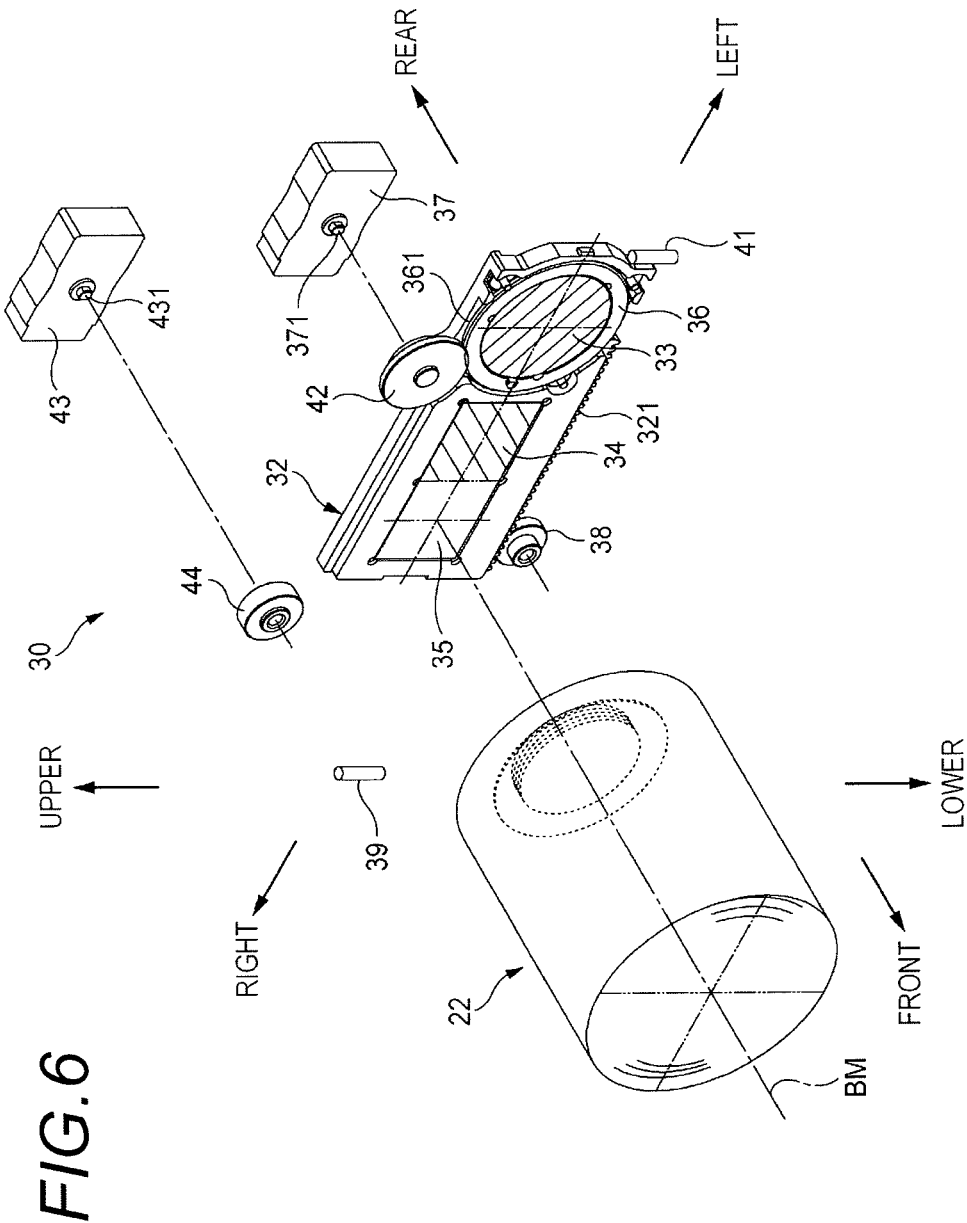
FIG. 6 is an exploded perspective view of the filter unit when the filter frame is in a position of a transmitting filter.

Furthermore, as illustrated in FIG. 6, in order to position the transmitting filter 35 that is disposed on the rightmost side in the filter frame 32, in the imaging region, a left limit stopper 41 is provided on the left side of the filter frame 32 so that the filter frame 32 cannot be moved to the left any further. Then, the movement of the filter frame 32 to the left is forcibly prevented and the rotation of the second motor 37 is stopped, and the filter frame 32 is not moved from the position.

Thus, it is possible to position the transmitting filter 35 to fit the imaging region. At this time, the position of the filter frame 32 is referred to as a transmitting filter position.

Figure 5:
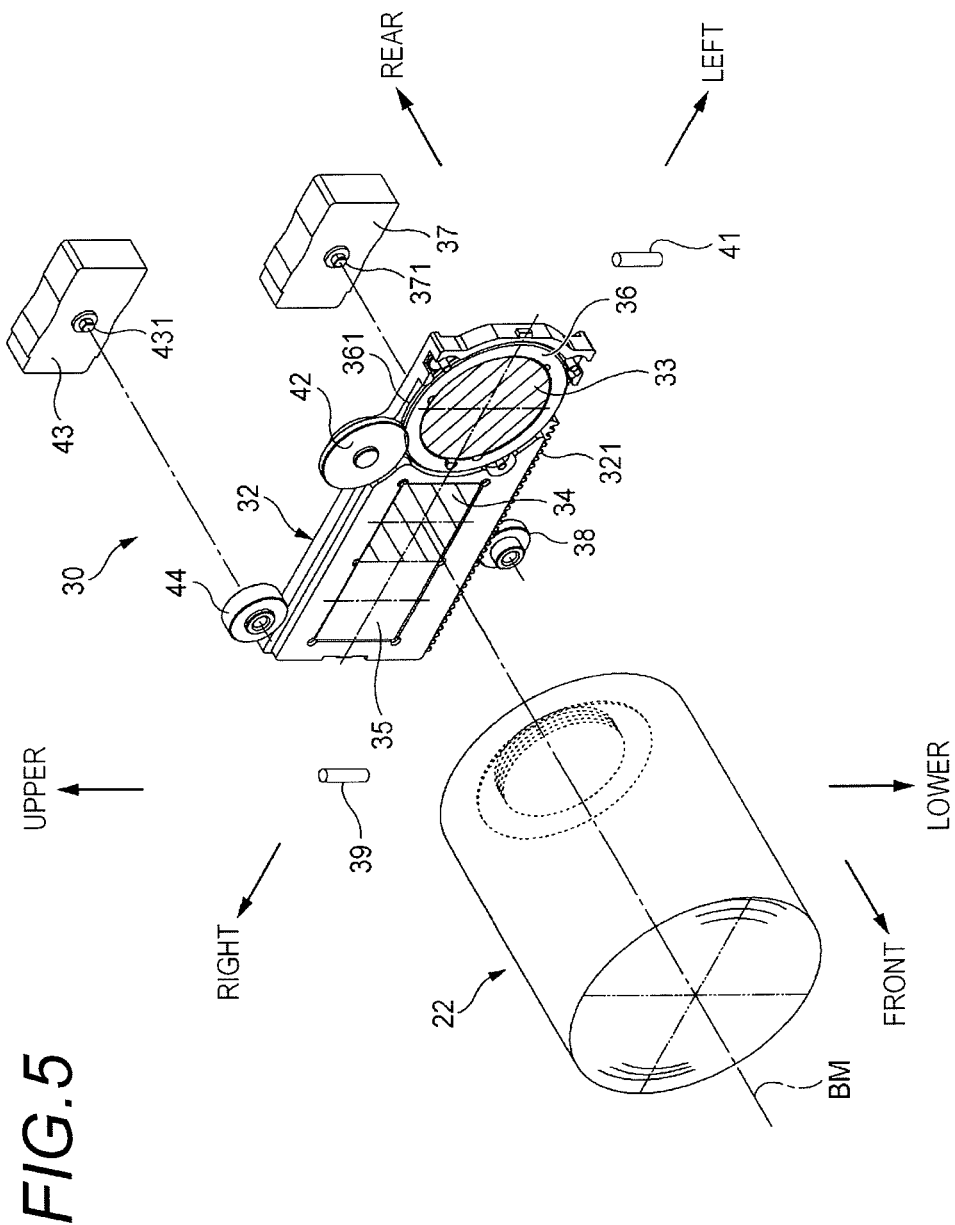
FIG. 5 is an exploded perspective view of the filter unit when the filter frame is in a position of an infrared ray cut filter.

Furthermore, as illustrated in FIG. 5, the position of the infrared ray cut filter 34 that is disposed on a center portion in the filter frame 32, in the imaging region, can be decided according to the number of rotation pulses of the second motor 37.

That is, the number of rotation pulses of the second motor 37 is counted based on the polarization filter position in which the filter frame 32 abuts the right limit stopper 39 or the transmitting filter position in which the filter frame 32 abuts the left limit stopper 41. Then, the second motor 37 is stopped at the time of the number of pulses in which the infrared ray cut filter 34 is positioned in the imaging region.

Therefore, it is possible to position the transmitting filter 35 to fit the imaging region. At this time, the position of the filter frame 32 is referred to as an infrared ray cut filter position.

Moreover, it is also possible to control the positions of the polarization filter 33 and the transmitting filter 35 by the number of pulses of the second motor 37.

As illustrated in FIGS. 3 and 4, the polarization filter 33 is supported by a circular first frame part 36. A gear unit 361 is formed on an outer peripheral surface (peripheral portion) of the first frame part 36.

An idler pulley 42 meshing with the gear unit 361 of the first frame part 36 is rotatably provided in an upper portion of the filter frame 32. The idler pulley 42 transmits power from a first motor 43 to the first frame part 36 through a gear 44 when the polarization filter 33 is disposed in the imaging region and transmits the power from the first motor 43 to the first frame part 36 through the gear 44 when the infrared ray cut filter 34 or the transmitting filter 35 is disposed in the imaging region. Therefore, the idler pulley 42 reciprocates in the left and right direction integrally with the filter frame 32, the first frame part 36, and the like when the power is transmitted from the first motor 43 to the first frame part 36 through the gear 44.

The first motor 43 for rotating the polarization filter 33 is provided on the rear surface of the rear case 312 of the filter case 31. A rotation shaft 431 of the first motor 43 protrudes to the inside of the filter case 31 path through the rear case 312 and the gear 44 is mounted inside the filter case 31 at the tip of the rotation shaft 431.

Moreover, when using the polarization filter 33, the idler pulley 42 mounted on the filter frame 32 is disposed so as to mesh with the gear 44 mounted on the first motor 43 when the filter frame 32 is moved to the rightmost side.

That is, the polarization filter 33 is provided in the left end of the filter frame 32 and the idler pulley 42 is provided in the right upper side of the first frame part 36 in the filter frame 32. Thus, when the filter frame 32 moves to the right and then abuts the right limit stopper 39, it is possible to easily mesh the idler pulley 42 with the gear 44 of the first motor 43.

Therefore, when rotating the first motor 43, the gear 44 rotates the first frame part 36 supporting the polarization filter 33 through the idler pulley 42.

Moreover, when disposing the infrared ray cut filter 34 and the transmitting filter 35 in the imaging region, the filter frame 32 and the idler pulley 42 is moved to the left side and the idler pulley 42 is separated from the gear 44 (see FIGS. 5 and 6). Thus, even if the first motor 43 is rotated, the polarization filter 33 does not rotate.

Next, a positioning operation of a selected filter to the imaging region will be described.

First, when using the polarization filter 33, as illustrated in FIG. 4, the second motor 37 is rotated, the pinion gear 38 is rotated, and the filter frame 32 is moved to the right.

If the filter frame 32 abuts the right limit stopper 39, the rotation of the second motor 37 is stopped, the filter frame 32 is not moved, and thereby the filter frame 32 is positioned in the polarization filter position.

Next, when using the transmitting filter 35, as illustrated in FIG. 6, the second motor 37 is rotated, the pinion gear 38 is rotated, and the filter frame 32 is moved to the left.

If the filter frame 32 abuts the left limit stopper 41, the rotation of the second motor 37 is stopped, the filter frame 32 is not moved, and thereby the filter frame 32 is positioned in the transmitting filter position.

Furthermore, when using the infrared ray cut filter 34, as illustrated in FIG. 5, the second motor 37 is rotated, the pinion gear 38 is rotated, and the filter frame 32 is moved.

At this time, the second motor 37 is rotated by the predetermined number of pulses and the filter frame 32 is stopped based on the polarization filter position or the transmitting filter position.

Therefore, the filter frame 32 is positioned in the transmitting filter position.

Next, when using the polarization filter 33, an adjusting operation of the polarization angle will be described.

As illustrated in FIG. 4, when the filter frame 32 is positioned in the polarization filter position, the polarization filter 33 is positioned in the imaging region and the idler pulley 42 provided in the filter frame 32 meshes with the gear 44 of the first motor 43.

Thus, when the first motor 43 is rotated by the predetermined number of pulses, the first frame part 36 supporting the polarization filter 33 is rotated and it is possible to adjust the polarization angle.

Next, a schematic configuration of an entirety of the monitoring camera system will be described with reference to the drawings.

Figure 7:
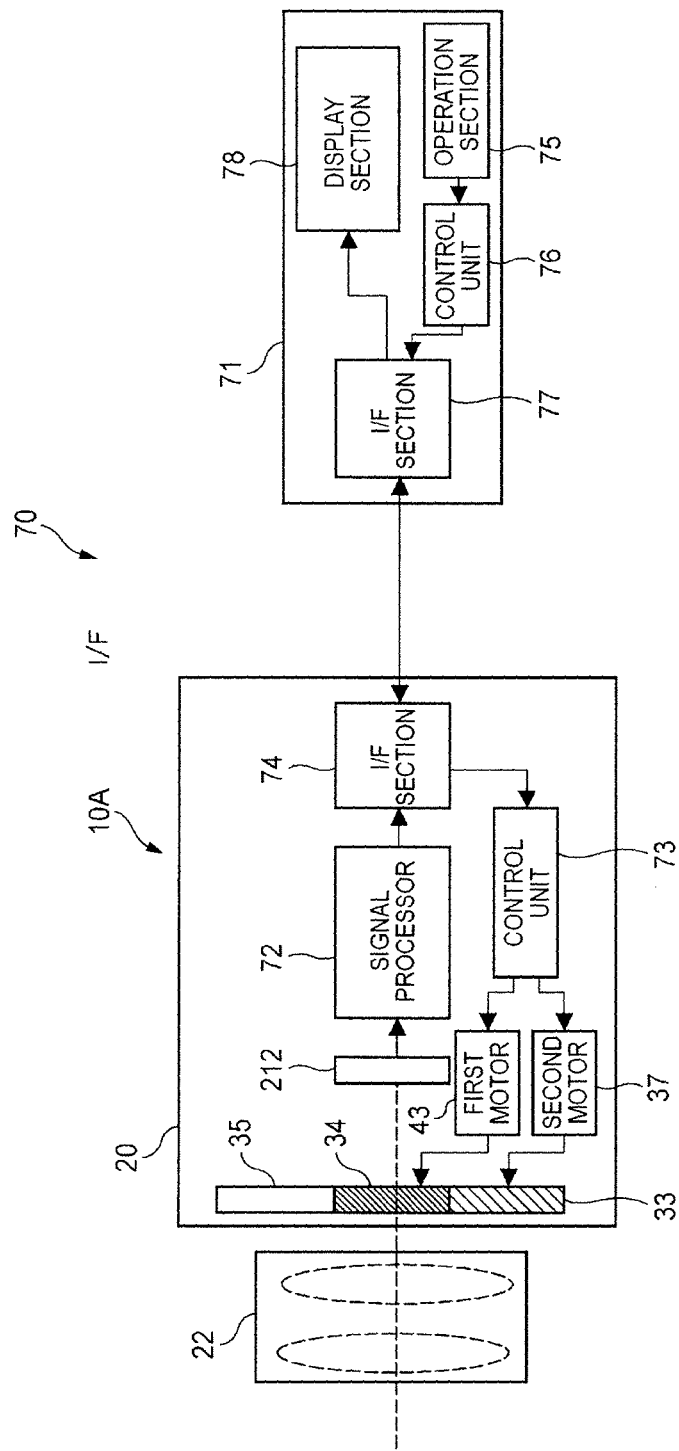
FIG. 7 is a schematic configuration view of an entirety of a monitoring camera system.

FIG. 7 illustrates a schematic configuration of the entirety of a monitoring camera system 70.

The monitoring camera system 70 is configured of the camera apparatus 10A and a PC (controller) 71.

A signal processor 72, a control unit 73, and an I/F section 74 are provided inside the camera body 20 in addition to the polarization filter 33, the infrared ray cut filter 34, the transmitting filter 35, the first motor 43, the second motor 37, and the imaging device 212 described above.

The signal processor 72 performs a video signal process of γ correction, gain correction, and the like to the signal from the imaging device 212 and outputs the signal to the I/F section 74. The I/F section 74 is connected to the outer PC (controller) 71 through a network and transmits the video signal from the signal processor 72, and transmits a control signal from the PC (controller) 71 to the control unit 73. The control unit 73 receives the control signal from the PC (controller) 71 through the I/F section 74 and controls the first motor 43 or the second motor 37.

Moreover, the operation section is also provided inside the camera body 20 and the first motor 43 or the second motor 37 may be controlled by the operation of the operation section. Furthermore, it is possible to automatically control the first motor 43 by detecting an amount of the incident light or to automatically control the second motor 37 according to pan and tilt positions and the like of the camera body 20.

On the other hand, the PC (controller) 71 is provided with an operation section 75, a control unit 76, an I/F section 77, and a display section 78.

The I/F section 77 is connected to the I/F section 74 of the camera body 20 through a network and receives the video signal from the camera body 20, and outputs the video signal to the display section 78. The display section 78 outputs the video signal received through the I/F section 77 to a screen. Furthermore, the operation section 75 inputs a signal for remotely operating the polarization angle of the polarization filter 33. The control unit 76 receives and analyzes the signal from the operation section 75, and transmits the control signal for controlling the polarization filter 33 to the camera body 20 through the I/F section 77.

Moreover, the operation of the operation section 75 may operate the turning on and off of the polarization filter in addition to the polarization angle of the polarization filter 33.

Next, operational effects of the camera apparatus will be described.

As illustrated in FIG. 1, the imaging device unit 21 having the imaging device 212 is accommodated in the camera body 20. Furthermore, the polarization filter 33 that transmits the light beams having a predetermined polarization component among the light beams incident on the imaging device 212 is provided. The polarization filter 33 is supported by the first frame part 36 and rotates by the first motor 43. The second motor 37 allows at least the polarization filter 33 and the infrared ray cut filter 34 to be capable of being inserted in and being removed from the imaging region of the imaging device 212. When the second motor 37 inserts the polarization filter 33 in the imaging region of the imaging device 212, the first motor 43 interlocks the first frame part 36 and the polarization filter 33 is rotated by the first motor 43.

Thus, the filter is selectively used and it is possible to steplessly adjust the polarization angle of the polarization filter 33.

Furthermore, according to the camera apparatus 10A, when the second motor 37 does not insert the polarization filter 33 in the imaging region of the imaging device 212, the first motor 43 is separated from the first frame part 36.

Thus, when the polarization filter 33 is not inserted in the imaging region of the imaging device 212, the polarization filter 33 is not used and thus is not rotated.

Furthermore, the camera apparatus 10A includes the filter frame 32 supporting at least the polarization filter 33 and the infrared ray cut filter 34, and the filter frame 32 is reciprocated by the second motor 37.

Thus, it is possible to selectively position the polarization filter 33 and the infrared ray cut filter 34 with respect to the imaging region of the imaging device 212 by rotating the second motor 37.

Furthermore, the camera apparatus 10A includes the idler pulley 42 that is provided in the filter frame 32 and meshes with the peripheral portion of the first frame part 36.

Therefore, it is possible to rotate the filter frame 32 by rotating the idler pulley 42.

Furthermore, in the camera apparatus 10A, when the second motor 37 inserts the polarization filter 33 in the imaging region, the idler pulley 42 meshes with the gear 44 connected to the first motor 43.

Thus, when the polarization filter 33 is inserted in the imaging region, it is possible to rotate the polarization filter 33 by the first motor 43.

Operational effects of the filter unit 30 will be described.

As illustrated in FIG. 1, the imaging device unit 21 having the imaging device 212 is accommodated in the filter unit 30. Furthermore, the polarization filter 33 that transmits the light beams having the predetermined polarization component among the light beams incident on the imaging device 212 is provided. The polarization filter 33 is supported by the first frame part 36 and is rotated by the first motor 43. The second motor 37 allows at least the polarization filter 33 and the infrared ray cut filter 34 to be capable of being inserted in and removed from the imaging region of the imaging device 212. When the second motor 37 inserts the polarization filter 33 in the imaging region of the imaging device 212, the first motor 43 interlocks the first frame part 36 and the first motor 43 rotates the polarization filter 33.

Therefore, the filter is selectively used and it is possible to steplessly adjust the polarization angle of the polarization filter 33.

Moreover, in each embodiment including this embodiment, the first motor 43 may rotate the polarization filter 33 before the second motor 37 completes the insertion of the polarization filter 33 in the imaging region of the imaging device 212. Therefore, even when the polarization filter 33 is not completely inserted in the imaging region of the imaging device 212, it is possible to rotate the polarization filter 33 at an earlier timing by the first motor 43.

Moreover, in each embodiment including this embodiment, the first motor 43 may rotate the polarization filter 33 before the polarization filter 33 overlaps the imaging region of the imaging device 212. Therefore, it is possible to perform preparation of the rotation of the polarization filter 33 at an earlier timing by the first motor 43.

Moreover, in each embodiment including this embodiment, the first motor 43 may rotate the polarization filter 33 when at least a part of the polarization filter 33 overlaps the imaging region of the imaging device 212. Therefore, at a timing in which a part of the polarization filter 33 approaches the imaging region, it is possible to rotate the polarization filter 33 at the earlier timing by the first motor 43.

Moreover, in each embodiment including this embodiment, the first motor 43 may rotate the polarization filter 33 after the second motor 37 completes the insertion of the polarization filter 33 in the imaging region of the imaging device 212. Therefore, the first motor 43 can form the image of only the light beams passed through the polarization filter 33.

(Second Embodiment)

Next, a camera apparatus and a filter unit of a second embodiment will be described.

Moreover, the same reference numerals are given to the portions that are common with the camera apparatus 10A and the filter unit 30 of the first embodiment described above and redundant description will be omitted.

Figure 8:
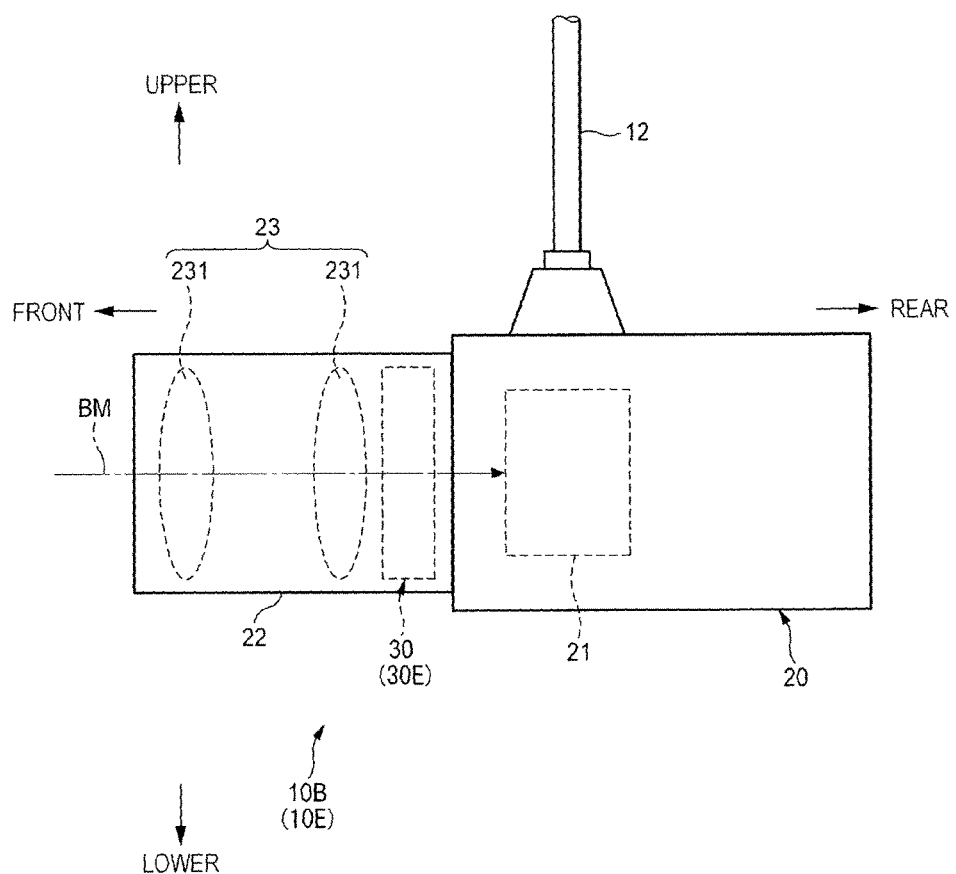
FIG. 8 is a side view of a camera apparatus of second and eighth embodiments according to the present invention.

As illustrated in FIG. 8, in a camera apparatus 10B of the second embodiment, a filter unit 30 is disposed between a lens group 23 inside a lens unit 22 and an imaging device unit 21 including an imaging device 212.

According to the camera apparatus 10B and the filter unit 30 of the second embodiment having such a configuration, it is possible to obtain the operations and effects similar to the camera apparatus 10A and the filter unit 30 of the first embodiment described above.

(Third Embodiment)

Next, a camera apparatus and a filter unit of a third embodiment will be described.

Moreover, the same reference numerals are given to the portions that are common with the camera apparatus 10A and the filter unit 30 of the first embodiment or the camera apparatus 10B and the filter unit 30 of the second embodiment described above, and redundant description will be omitted.

Figure 9:
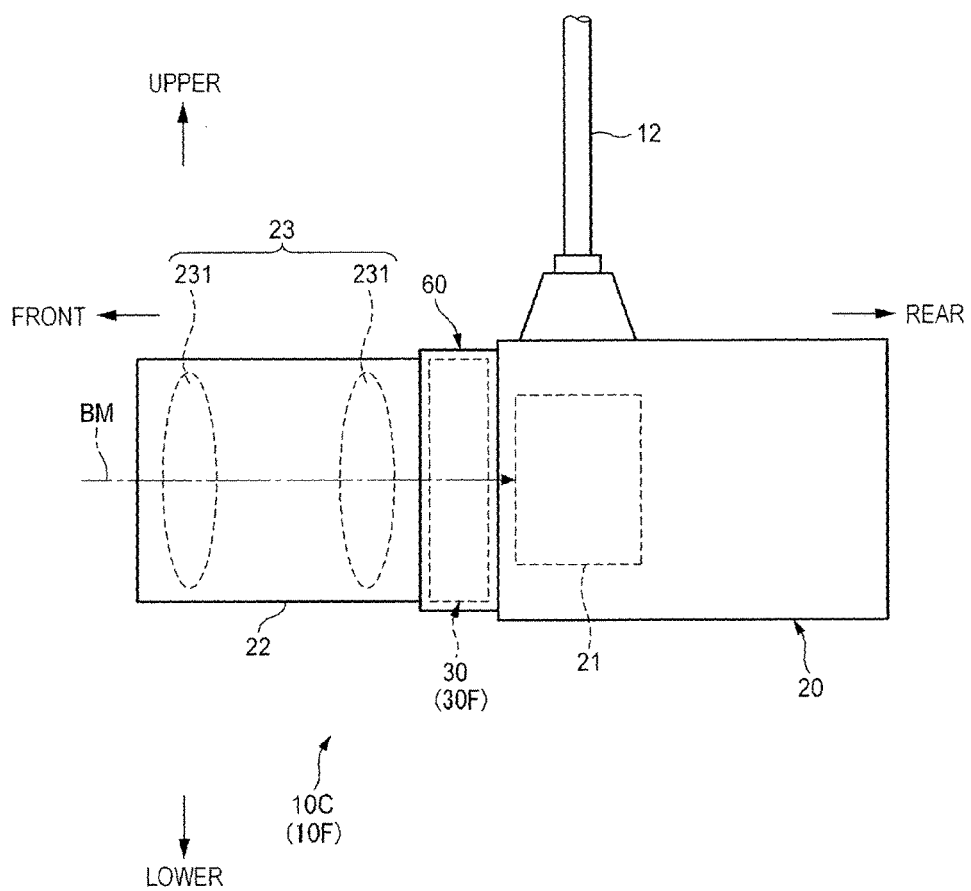
FIG. 9 is a side view of a camera apparatus of third and ninth embodiments according to the present invention.

As illustrated in FIG. 9, in a camera apparatus 10C of the third embodiment, a connection section 60 is provided between a camera body 20 and a lens unit 22, and a filter unit 30 is accommodated in the connection section 60.

According to the camera apparatus 10C and the filter unit 30 of the third embodiment having such a configuration, it is possible to obtain the operations and effects similar to the camera apparatus 10A and the filter unit 30 of the first embodiment described above.

The camera apparatus and the filter unit of the present invention is not limited to each embodiment described above and may be appropriately deformed and improved.

For example, in each embodiment described above, in a case where the polarization filter 33 is disposed in the left end of the filter frame 32, the infrared ray cut filter 34 is disposed in the center, and the transmitting filter 35 is disposed in the right end is exemplified.

The invention is not limited to the exemplified arrangement.

That is, in the examples described above, the polarization filter 33 is provided in the left end of the filter frame 32 and the idler pulley 42 is provided in the right upper side of the first frame part 36 in the filter frame 32. Thus, when the filter frame 32 moves to the right, abuts the right limit stopper 39, and is stopped, it is possible to easily mesh with the gear 44 of the first motor 43. If the polarization filter 33 is provided in the right end of the filter frame 32, it is possible to obtain the entirely similar configuration by reversing the left and right.

Figure 10:
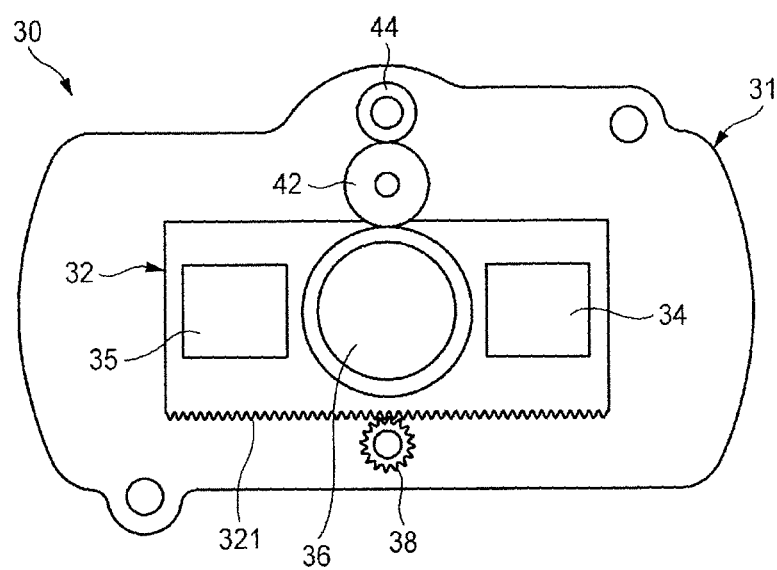
FIG. 10 is a configuration view illustrating a modification example of a filter unit of the present invention.

Here, as illustrated in FIG. 10, it is possible to provide the idler pulley 42 directly above the first frame part 36 in the filter frame 32. In this case, since the idler pulley 42 can pass through the gear 44 of the first motor 43 to the left and right, the arrangement of the polarization filter 33 is not limited to the end portion of the filter frame 32 and the polarization filter 33 may be arranged in the center portion.

Furthermore, as the transmitting filter 35, a case where the transparent glass is provided is exemplified, but it is possible that nothing is provided.

Furthermore, in the examples described above, the rotational force of the first motor 43 and the second motor 37 is transmitted using the gear, but it is not limited to the gear.

In the camera apparatus of the related art such as JP-A-9-266572 described above, the inserting and removing mechanism by which the polarization filter 104 is turned on and off and the driving mechanism that adjusts the polarization angle are separately provided, and there is a problem that the camera apparatus is difficult to be miniaturized.

Thus, in each embodiment described below, in order to solve the problem of the related art, an example of the camera apparatus and the filter unit in which the inserting and removing mechanism by which the polarization filter is turned on and off and the driving mechanism that adjusts the polarization angle are realized in a common mechanism will be described.

(Fourth Embodiment)

Hereinafter, a camera apparatus and a filter unit of a fourth embodiment will be described with reference to the drawings. Moreover, the same reference numerals are given to the portions that are common with the camera apparatus 10A and a filter unit 30A of the first embodiment and redundant description will be omitted.

Figure 12:
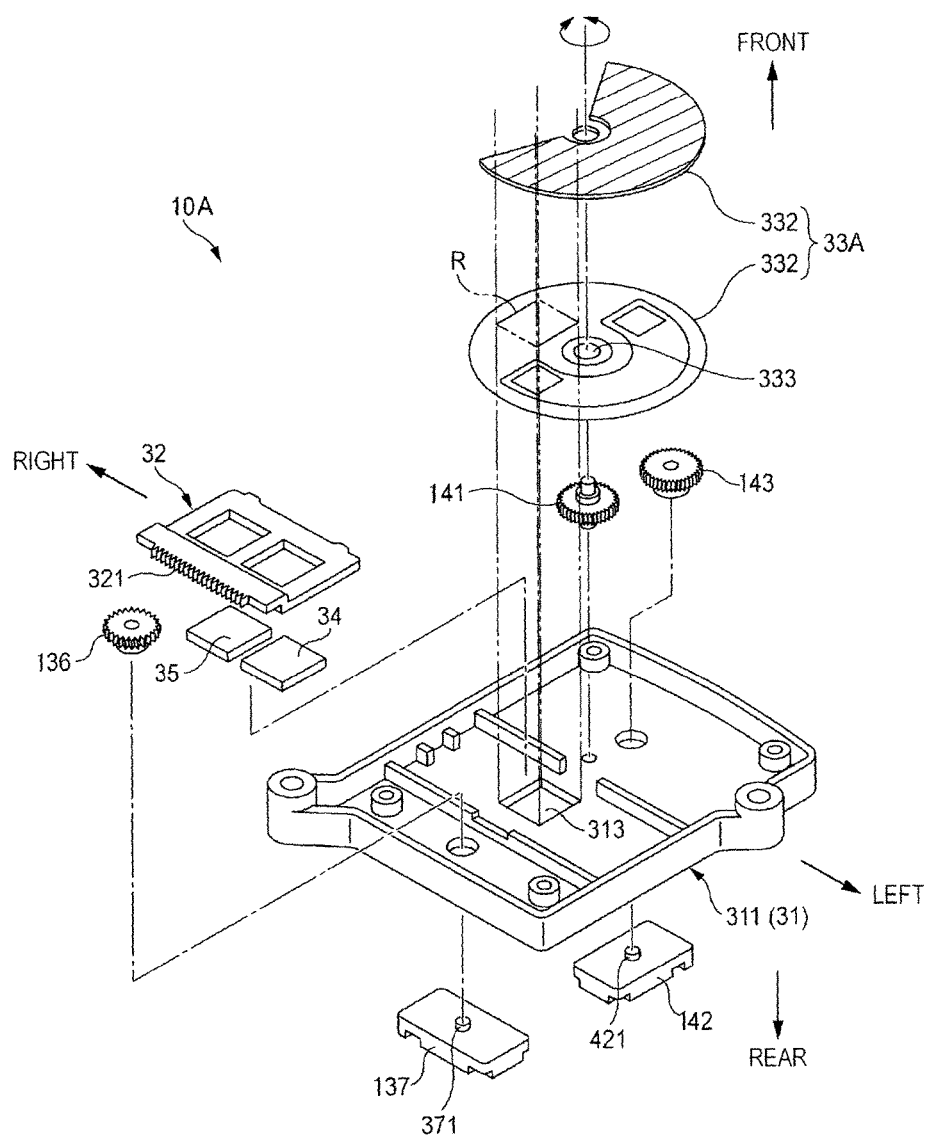
FIG. 12 is an exploded perspective view illustrating the filter unit viewed from a front side.

As illustrated in FIGS. 11A, 11B, and 12, an opening 313 is provided in a region corresponding to the imaging region R of an imaging device 212 in both front and rear cases (a rear case 312 and a front case 311). Moreover, the imaging region is a region (area) of the light flux inserted in the imaging device 212.

Figure 13:
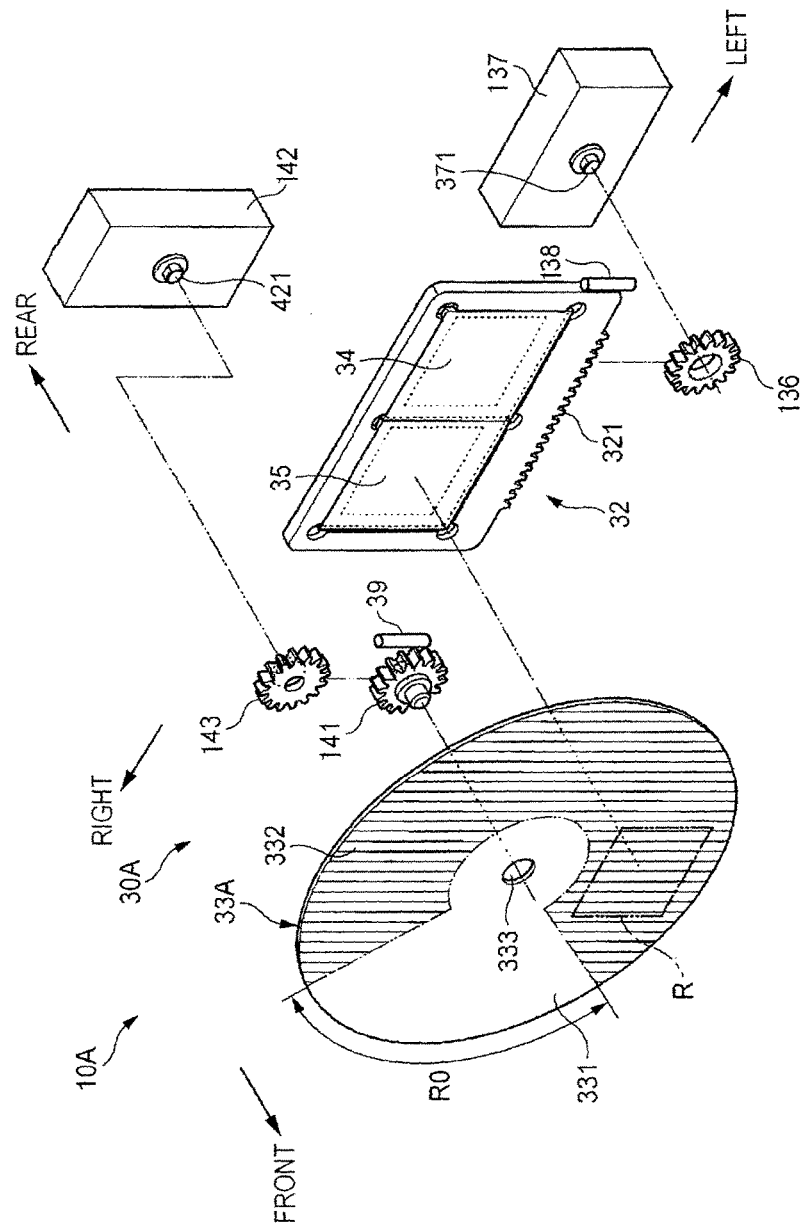
FIG. 13 is an exploded perspective view illustrating a reciprocating mechanism of the filter frame and a rotating mechanism of the polarization filter in the filter unit.

As illustrated in FIGS. 12 and 13, a filter frame 32 is divided into two. An infrared ray cut filter 34, and a transmitting filter 35 are fitted into the filter frame 32. The infrared ray cut filter 34 does not transmit (reflect) the infrared rays and transmits only visible light. The transmitting filter 35 is a transparent glass and transmits all light beams.

A rack gear 321 is formed on a lower surface of the filter frame 32. A frame switching motor (motor unit) 137 for reciprocating the filter frame 32 is mounted on the rear surface of the rear case 312 of the filter case 31. A rotation shaft 371 of the frame switching motor 137 protrudes to the inside of the filter case 31 by passing through the rear case 312. A pinion gear 136 is mounted on the rotation shaft 371 inside the filter case 31. The pinion gear 136 meshes with the rack gear 321 of the filter frame 32.

Therefore, since the pinion gear 136 is rotated and the rack gear 321 is reciprocated by rotating the frame switching motor 137, the filter frame 32 reciprocates to the left and right.

When performing the imaging, one of the infrared ray cut filter 34 and the transmitting filter 35 is selectively positioned in the imaging region R of the imaging device 212 by moving the filter frame 32 to the left and right.

As illustrated in FIG. 13, in order to position the transmitting filter 35 that is disposed on the right side in the filter frame 32, in the imaging region R, for example, a left limit stopper 138 is provided on the left side of the filter frame 32 so that the filter frame 32 cannot be moved to the left any further.

Then, the movement of the filter frame 32 to the left is forcibly prevented and the rotation of the frame switching motor 137 is stopped.

Thus, it is possible to position the transmitting filter 35 in the imaging region R. At this time, the position of the filter frame 32 is referred to as a transmitting filter position.

Furthermore, in order to position the infrared ray cut filter 34 that is disposed on the left side in the filter frame 32 in the imaging region R, a right limit stopper 39 is provided on the right side of the filter frame 32 so that the filter frame 32 cannot be moved to the right any further.

Then, the movement of the filter frame 32 to the right is forcibly prevented and the rotation of the frame switching motor 137 is stopped.

Thus, it is possible to position the infrared ray cut filter 34 in the imaging region R. At this time, the position of the filter frame 32 is referred to as an infrared ray cut filter position.

A polarization filter 33A is rotatably provided on the front side of the filter frame 32 parallel to the filter frame 32. The polarization filter 33A transmits only the light beams having a predetermined polarization component and removes unnecessary light beams by a rotation angle of the polarization filter 33A.

The polarization filter 33A includes a circular polarization plate holder 331 that is formed of, for example, a transparent glass plate, and a polarization plate 332 mounted on the front surface of the polarization plate holder 331. The polarization plate 332, for example, is a fan shape having a central angle of approximately 270 degrees.

Therefore, the light beams pass through a region (transmitting section) R0 on which the polarization plate 332 is not mounted and the polarization filter 33A is turned off.

The polarization filter 33A is mounted on a position in which the imaging region R can be completely accommodated.

As illustrated in FIGS. 12 and 13, a polarization plate gear 141 is fixedly mounted on a through hole 333 which is a center of the polarization plate holder 331 of the polarization filter 33A.

A polarization plate motor 142 for rotating the polarization filter 33A is provided on the rear surface of the rear case 312 of the filter case 31. A rotation shaft 421 of the polarization plate motor 142 protrudes inside the filter case 31 by passing through the rear case 312 and a gear 143 is mounted inside the filter case 31 at the tip of the rotation shaft 421.

Thus, when rotating the polarization plate motor 142, the gear 143 rotates the polarization plate gear 141 through the rotation shaft 421 and rotates the polarization filter 33A.

FIGS. 14A to 14F illustrate a relationship between the polarization filter 33A and the imaging region R.

Figure 14A:
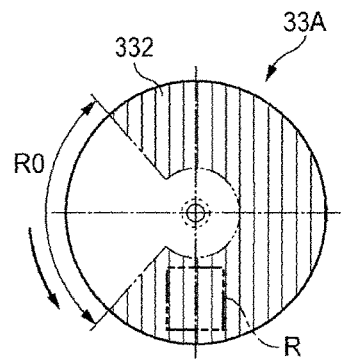
FIGS. 14A to 14F are explanatory views illustrating a relationship between a rotation of the polarization filter and an imaging region.
Figure 14D:
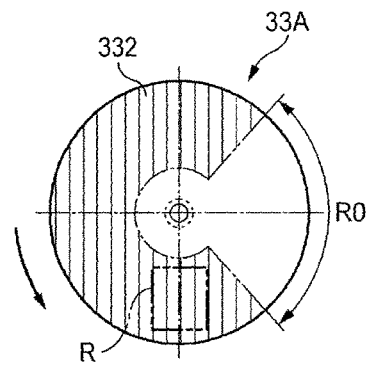
Figure 14B:
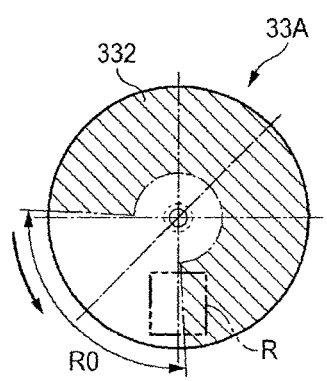

When rotating the polarization filter 33A from FIG. 14A in a counterclockwise direction, in FIGS. 14A, 14B, and 14D, since the imaging region R is a region on which the polarization plate 332 is mounted, the polarization filter 33A is turned on. Moreover, in FIG. 14B, a part of the imaging region R is a region on which the polarization plate 332 is mounted.

Figure 14E:
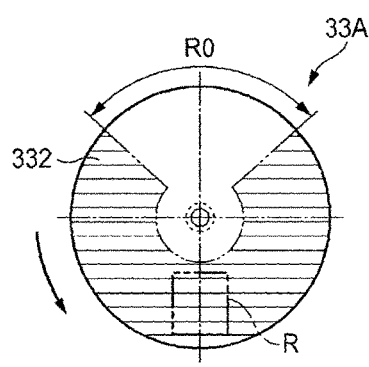
Figure 14C:
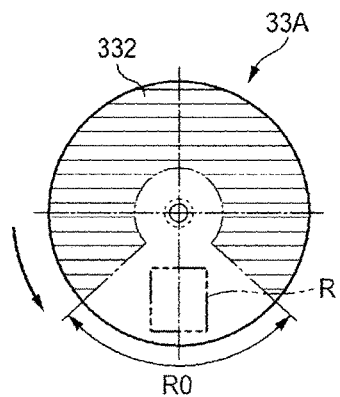

In FIG. 14C, since the imaging region R is the transmitting section R0 on which the polarization plate 332 is not mounted, the polarization filter 33A is turned off.

Figure 14F:
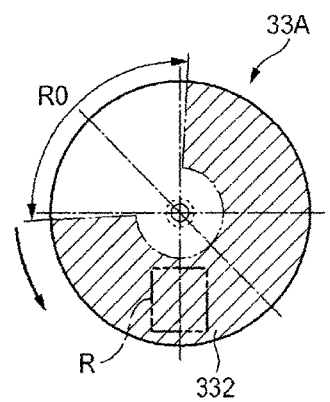

When being further rotated, in FIGS. 14E and 14F, since the imaging region R is positioned again in the region on which the polarization plate 332 is mounted, the polarization filter 33A is turned on.

Next, selection of the filter to be used will be described.

First, when any of the filters is not used at night and the like, the transmitting filter 35 is selected and the transmitting section R0 in the polarization filter 33A is positioned in the imaging region R.

That is, the filter frame 32 is moved to the left by the pinion gear 136 and the rack gear 321 by rotating the frame switching motor 137. When the filter frame 32 abuts the left limit stopper 138, the frame switching motor 137 is stopped and thereby the filter frame 32 is stopped. Therefore, the transmitting filter 35 is positioned in the imaging region R (transmitting filter position).

Furthermore, the polarization plate motor 142 is rotated and the polarization plate gear 141 is rotated through the gear 143, and then the polarization filter 33A is rotated. Then, if the transmitting section R0 is positioned in the imaging region R, the polarization plate motor 142 is stopped (see FIG. 14D).

Therefore, reflected light from the object to be imaged passes through the lens unit 22 and passes through the transmitting section R0 of the polarization filter 33A and the transmitting filter 35, and is received in the imaging device 212.

Next, a case where only the polarization filter 33A is used will be described.

In this case, similar to the case described above, the transmitting filter 35 is positioned in the imaging region R by moving the filter frame 32.

Then, the polarization plate 332 is positioned in the imaging region R by rotating the polarization plate motor 142.

Moreover, the adjustment of the polarization angle is performed by the rotation of the polarization plate motor 142.

Next, a case where the infrared ray cut filter 34 is used, for example, at day time and the like will be described.

In this case, the infrared ray cut filter 34 is selected and the transmitting section R0 in the polarization filter 33A is positioned in the imaging region R.

That is, the filter frame 32 is moved to the right by rotating the frame switching motor 137. When the filter frame 32 abuts the right limit stopper 39, the frame switching motor 137 is stopped and thereby the filter frame 32 is stopped. Therefore, the infrared ray cut filter 34 is positioned in the imaging region R.

Then, as described above, if the polarization plate motor 142 is rotated, the polarization filter 33A is rotated, and then the transmitting section R0 is positioned in the imaging region R, the polarization plate motor 142 is stopped (see FIG. 14D).

As illustrated in FIG. 7, also similar to this embodiment, a control unit 73 receives a control signal from a PC (controller) 71 through an I/F section 74 and controls the polarization plate motor 142 or the frame switching motor 137. Moreover, an operation section is also provided inside the camera body 20 and the polarization plate motor 142 or the frame switching motor 137 may be controlled by the operation of the operation section. Furthermore, it is possible to automatically control the frame switching motor 137 by detecting an amount of the incident light or to automatically control the polarization plate motor 142 according to pan and tilt positions, and the like of the camera body 20.

Moreover, the operation of the operation section 75 may perform the turning on and off of the polarization filter 33A in addition to the polarization angle of the polarization filter 33A.

Then, in this manner, since a rotation support section of the polarization filter 33A may be a point of the center of the polarization filter 33A, for example, it is not necessary to provide a mechanism for transmitting a rotational torque to the support section of the polarization filter 33A, in which three or more support sections rotatably supporting the polarization filter 33A are provided around the polarization filter 33A and the gear is formed around an entire periphery of the polarization filter 33A. Therefore, it is possible to achieve simplification of the structure.

Next, operational effects of the camera apparatus will be described.

As illustrated in FIGS. 1, 11A, and 11B, the camera apparatus 10A includes the camera body 20 in which the imaging device 212 is built and the lens unit 22 that accommodates the lens group 23 formed of the plurality of lenses 231 transmitting the light to the imaging device 212. Furthermore, the polarization filter 33A that transmits the light beams having the predetermined polarization component among the light beams incident on the imaging device 212 is disposed between the imaging device 212 and the lens unit 22.

The polarization filter 33A is rotated by the polarization plate motor 142 and performs inserting and removing of the polarization filter 33A, and adjusting of the polarization angle.

Therefore, it is possible to realize the inserting and removing mechanism that performs the turning on and off of the polarization filter 33A and the driving mechanism that adjusts the polarization angle in a common mechanism.

Furthermore, in the camera apparatus 10A, the center shaft of the polarization filter 33A is a shaft parallel to the imaging axis of the imaging device 212.

Thus, it is possible to rotate the polarization filter 33A on the surface orthogonal to the imaging axis.

Furthermore, in the camera apparatus 10A, the transmitting section R0 is provided in a part of the polarization filter 33A.

Therefore, it is possible to easily switch the turning on and off of the polarization filter 33A by rotating the polarization filter 33A.

Furthermore, the camera apparatus 10A includes the infrared ray cut filter 34 that transmits the visible light and the frame switching motor 137 reciprocates the infrared ray cut filter 34.

Thus, it is possible to easily insert and remove the infrared ray cut filter 34 into and from the imaging axis.

Next, operational effects of the filter unit 30A will be described.

The filter unit 30A is disposed between the imaging device 212 and the lens unit 22. The filter unit 30A includes the polarization filter 33 that transmits the light beams having the predetermined polarization component among the light beams incident on the imaging device 212 and the polarization plate motor 142 that rotates the polarization filter.

Thus, it is possible to realize the inserting and removing mechanism that performs the turning on and off of the polarization filter 33 and the driving mechanism that adjusts the polarization angle in a common mechanism by rotating the polarization filter 33 by the polarization plate motor 142.

(Fifth Embodiment)

Next, a camera apparatus and a filter unit of a fifth embodiment will be described.

Moreover, the same reference numerals are given to the portions that are common with the camera apparatus 10A and the filter unit 30A of the fourth embodiment described above and redundant description will be omitted.

As illustrated in FIG. 15, in a camera apparatus 10B and a filter unit 30B of the fifth embodiment, a transmitting section R1 of a polarization filter 33B is formed by cutting a polarization plate 332 and a polarization plate holder 331.

Figure 16A:
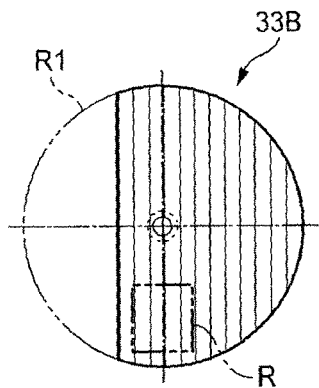
FIGS. 16A to 16F are explanatory views illustrating a relationship between the rotation of the polarization filter and the imaging region.
Figure 16D:
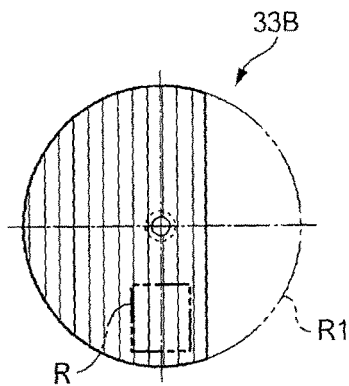
Figure 16B:
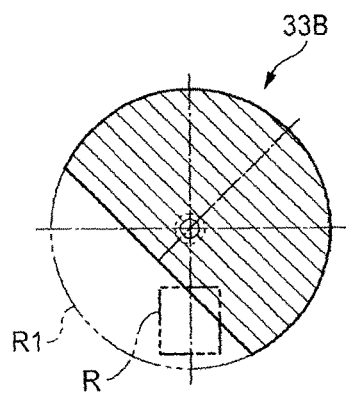
Figure 16E:
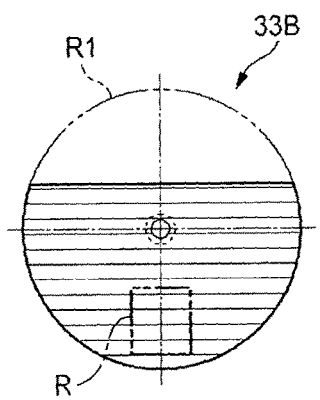
Figure 16C:
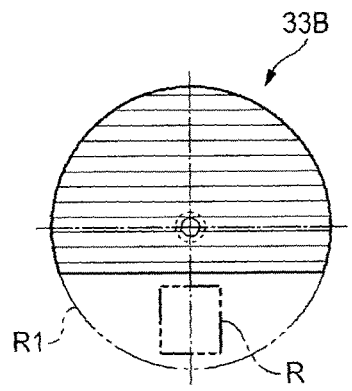
Figure 16F:
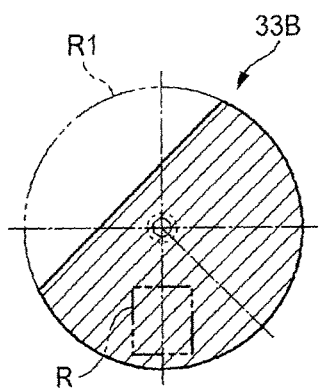

As illustrated in FIG. 16C, the polarization filter 33B is turned off when the transmitting section R1 that is cut is positioned in the imaging region R.

Also in the configuration, it is possible to obtain the operations and effects similar to the camera apparatus 10A and the filter unit 30A of the fourth embodiment described above.

(Sixth Embodiment)

Next, a camera apparatus and a filter unit of a sixth embodiment will be described.

Moreover, the same reference numerals are given to the portions that are common with the camera apparatus 10A and the filter unit 30A of the first embodiment and the camera apparatus 10B and the filter unit 30B of the second embodiment described above, and redundant description will be omitted.

As illustrated in FIG. 17, in a camera apparatus 10C and a filter unit 30C of the sixth embodiment, the movement of the filter frame 32 and the rotation of the polarization filter 33A are performed by one motor 144.

That is, a pulley 45 is fixedly mounted on a rotation shaft 441 of the motor 144 and the pulley 45 is fixedly mounted on the polarization filter 33A. The pinion gear 136 rotatably fits onto a shaft section 451 of the pulley 45. Then, a slide member 46 is provided between a front surface 1361 of the pinion gear 136 and a flange section 452 of the pulley 45.

Then, when rotating the motor 144, the pulley 45 is rotated and the polarization filter 33A is rotated. Simultaneously, the pulley 45 rotates the pinion gear 136 through the slide member 46 and moves the filter frame 32 to left and right. When the filter frame 32 abuts the left limit stopper 138 or the right limit stopper 39, the movement of the filter frame 32 is prevented and the slide member 46 is slipped and the pinion gear 136 idles against the pulley 45, and then only the polarization filter 33A rotates.

Therefore, the motor 144 rotates the pinion gear 136 through the pulley 45 and the slide member 46, and reciprocates the infrared ray cut filter 34 and the transmitting filter 35 along the arrangement direction. When the filter frame 32 abuts the left limit stopper 138 or the right limit stopper 39, the rotation of the pinion gear 136 is stopped because of being slipped by the slide member 46.

When further rotating the motor 144, since only the polarization filter 33A mounted on the rotation shaft 441 rotates, it is possible to steplessly adjust the polarization angle.

Furthermore, in a state where the infrared ray cut filter 34 is disposed on the imaging axis BM of the imaging device 212, since the filter frame 32 is in a state of abutting the right limit stopper 39, the motor 144 rotates the polarization filter 33A to the right. Therefore, it is possible to rotate only the polarization filter 33A without moving the filter frame 32.

On the other hand, in a state where the transmitting filter 35 is disposed on the imaging axis BM of the imaging device 212, since the filter frame 32 is in a state of abutting the left limit stopper 138, the motor 144 rotates the polarization filter 33A to the left. Therefore, it is possible to rotate only the polarization filter 33A without moving the filter frame 32. Moreover, a series of the operations are controlled by the control unit 73.

Next, operational effects of the camera apparatus 10C and the filter unit 30C of the sixth embodiment will be described.

As illustrated in FIG. 17, in the rotation shaft 441 of the motor 144, the pinion gear (gear) 136 rotatably passes through the rotation shaft 441. Furthermore, the slide member 46 is interposed between the pinion gear 136 and the polarization filter 33A.

Therefore, the motor 144 rotates the pinion gear 136 through the polarization filter 33A and reciprocates the infrared ray cut filter 34 and the transmitting filter 35 along the arrangement direction. When the filter frame 32 abuts the left limit stopper 138 or the right limit stopper 39, the rotation of the pinion gear 136 is stopped because of being slipped by the slide member 46 and the movement of the filter frame 32 is stopped.

When further rotating the motor 144, since only the polarization filter 33A mounted on the rotation shaft 441 rotates, it is possible to steplessly adjust the polarization angle.

Therefore, since the filter frame 32 is moved and the polarization filter 33A is rotated by one motor 144, it is possible to steplessly adjust the polarization angle.

(Seventh Embodiment)

Next, a camera apparatus and a filter unit of a seventh embodiment will be described.

Moreover, the same reference numerals are given to the portions that are common with the camera apparatus 10A and the filter unit 30A of the fourth embodiment to the camera apparatus 10C and the filter unit 30C of the sixth embodiment described above, and redundant description will be omitted.

Figure 18:
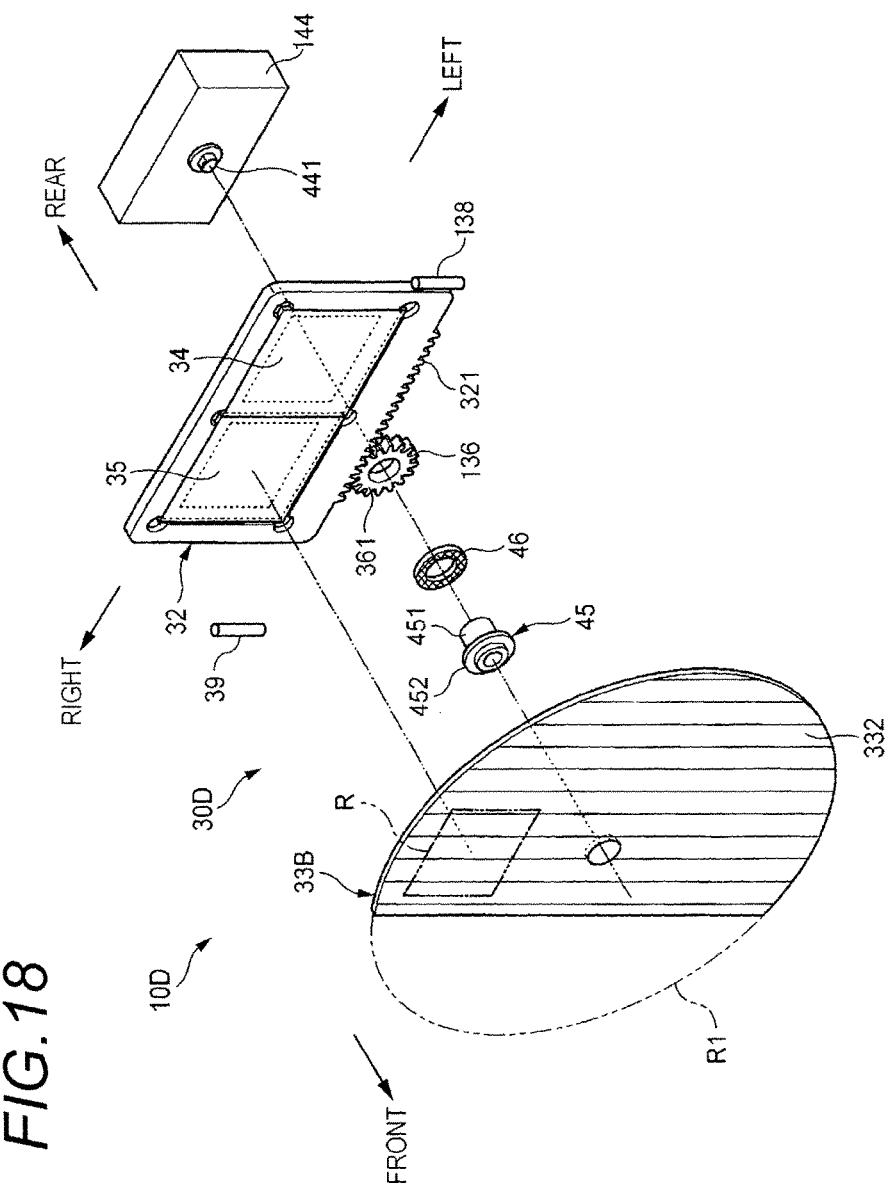
FIG. 18 is an exploded perspective view illustrating a configuration of a filter unit in a camera apparatus of a sixth embodiment according to the present invention.
Figure 19:
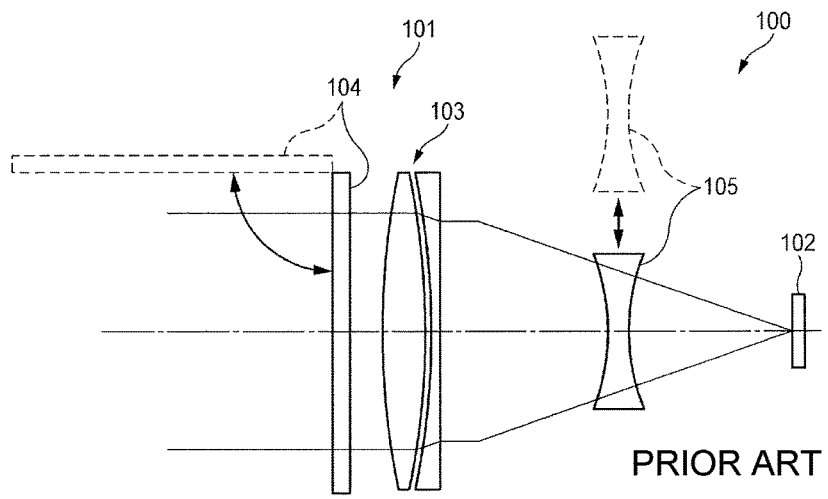
FIG. 19 is a schematic configuration view of a camera apparatus of the related art.
Figure 20:
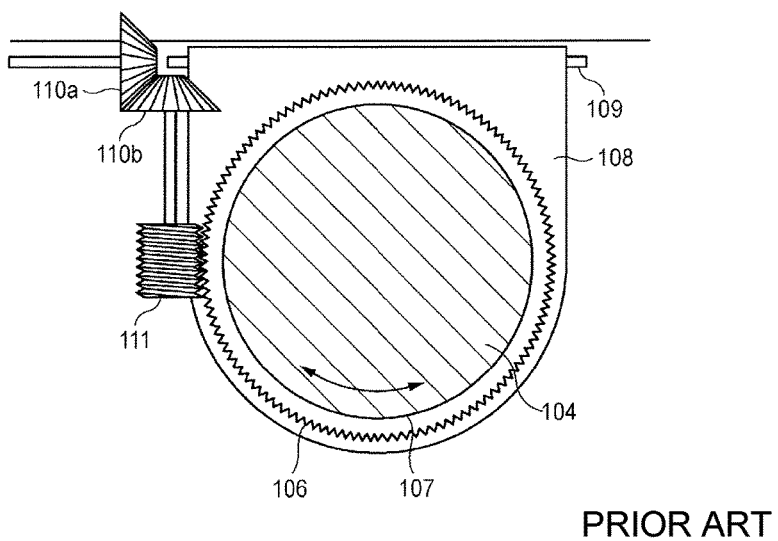
FIG. 20 is a plan view illustrating a configuration example of a rotating mechanism of a polarization filter in the camera apparatus of the related art.

As illustrated in FIG. 18, in a camera apparatus 10D and a filter unit 30D of the seventh embodiment, a transmitting section R1 of a polarization filter 33B is formed by cutting a polarization plate 332 and a polarization plate holder 331. The configurations other than that are similar to the camera apparatus 10C and the filter unit 30C according to the sixth embodiment described above.

Also in the configuration, it is possible to obtain the operations and effects similar to the camera apparatus 10C and the filter unit 30C of the sixth embodiment described above.

(Eighth Embodiment)

Next, a camera apparatus and a filter unit of an eighth embodiment will be described.

Moreover, the same reference numerals are given to the portions that are common with the camera apparatus 10A and the filter unit 30A of the fourth embodiment to the camera apparatus 10D and the filter unit 30D of the seventh embodiment described above, and redundant description will be omitted.

As illustrated in FIG. 8, in a camera apparatus 10E of the eighth embodiment, a filter unit 30E is disposed between a lens group 23 inside the lens unit 22 and an imaging device unit 21 including an imaging device 212.

According to the camera apparatus 10E and the filter unit 30E of the eighth embodiment having such a configuration, it is possible to obtain the operations and effects similar to the camera apparatus 10A and the filter unit 30A of the fourth embodiment described above.

(Ninth Embodiment)

Next, a camera apparatus and a filter unit of a ninth embodiment will be described.

Moreover, the same reference numerals are given to the portions that are common with the camera apparatus 10A and the filter unit 30A of the fourth embodiment to the camera apparatus 10E and the filter unit 30E of the eighth embodiment described above, and redundant description will be omitted.

As illustrated in FIG. 9, in a camera apparatus 10F of the ninth embodiment, a connection section 60 is provided between a camera body 20 and a lens unit 22, and a filter unit 30F is accommodated in the connection section 60.

According to the camera apparatus 10F and the filter unit 30F of the ninth embodiment having such a configuration, it is possible to obtain the operations and effects similar to the camera apparatus 10A and the filter unit 30A of the fourth embodiment described above.

The camera apparatus and the filter unit of the present invention is not limited to each embodiment described above and may be appropriately deformed and improved.

Moreover, as in-vehicle equipment (for example, in-vehicle camera apparatus), the camera apparatus of each embodiment described above may include the lens to face a traveling direction of the vehicle within the vehicle (for example, an automobile). In this case, the camera apparatus can efficiently remove the reflected light in a front glass of an oncoming vehicle or a rear glass of a front vehicle by the polarization filter and it is possible to clearly image a state or the face of a person of the oncoming vehicle or the front vehicle.

The present invention can be applied to the camera apparatus in which the polarization filter is capable of being turned on and off and the filter unit used for the camera apparatus.

The present application is based on and claims the benefit of Japanese patent applications No. 2013-163246 filed on Aug. 6, 2013, No. 2013-163986 filed on Aug. 7, 2013, and No. 2014-142659 filed on Jul. 10, 2014, the contents of which are incorporated by reference in its entirety.

What is claimed is:

1. A camera apparatus comprising:
   an imaging device;
   a gear;
   a polarization filter that transmits a polarization component;
   an infrared ray cut filter that cuts infrared rays;
   a first motor that rotates the polarization filter via the gear;
   an idler pulley that is positioned between the gear and the polarization filter, receives power from the first motor via the gear, transmits the power received from the first motor to the polarization filter by contact of the gear with the idler pulley and by contact of the idler pulley with an outer periphery of the polarization filter, and rotates the polarization filter based on the power received from the first motor; and
   a second motor that translates the infrared ray cut filter together with the polarization filter and the idler pulley by linear reciprocation along a predetermined direction between a first position and a second position, wherein
   in the first position, the infrared ray cut filter is inserted in an imaging region, the gear is separated from the idler pulley, and the idler pulley and the polarization filter are in contact with each other,
   in the second position, the polarization filter is inserted in the imaging region, the gear is in contact with the idler pulley, and the idler pulley and the polarization filter are in contact with each other
   the infrared ray cut filter cuts the infrared rays of light beams incident on the imaging device in the first position in which the infrared ray cut filter is inserted in the imaging region by the second motor, and
   the polarization filter that transmits the polarization component of light beams incident on the imaging device in the second position in which the polarization filter is inserted in the imaging region by the second motor.

2. The camera apparatus according to claim 1, further comprising:
   a first frame that supports the polarization filter, wherein the gear and the first frame are separated from each other before the polarization filter is inserted in the imaging region of the imaging device by the second motor and the gear and the first frame are connected to each other via the idler pulley and the polarization filter is rotated by the first motor via the gear, the idler pulley and the first frame in the second position in which the polarization filter is inserted in the imaging region of the imaging device by the second motor.

3. The camera apparatus according to claim 2, further comprising:
   a second frame that supports at least the polarization filter and the infrared ray cut filter, wherein the second motor moves the second frame.

4. The camera apparatus according to claim 3, wherein the idler pulley is provided in the second frame and meshes with a peripheral gear provided at a periphery of the first frame.

5. The camera apparatus according to claim 4, wherein the idler pulley meshes with the gear connected to the first motor in the second position in which the polarization filter is inserted in the imaging region of the imaging device by the second motor.

6. The camera apparatus according to claim 1, wherein the first motor rotates the polarization filter about a center axis of the polarization filter after insertion of the polarization filter in the imaging region of the imaging device is completed by the second motor.

7. A filter apparatus comprising:
   a gear;
   a polarization filter that transmits a polarization component;
   an infrared ray cut filter that cuts infrared rays;
   a first motor that rotates the polarization filter via the gear;
   an idler pulley that is positioned between the gear and the polarization filter, receives power from the first motor via the gear, transmits the power received from the first motor to the polarization filter by contact of the gear with the idler pulley and by contact of the idler pulley with an outer periphery of the polarization filter, and rotates the polarization filter based on the power received from the first motor; and
   a second motor that is adapted to translate the infrared ray cut filter together with the polarization filter and the idler pulley by linear reciprocation along a predetermined direction between a first position and a second position, wherein
   in the first position, the infrared ray cut filter is inserted in an imaging region, the gear is separated from the idler pulley, and the idler pulley and the polarization filter are in contact with each other,
   in the second position, the polarization filter is inserted in the imaging region, the gear is in contact with the idler pulley, and the idler pulley and the polarization filter are in contact with each other,
   the infrared ray cut filter is adapted to cut the infrared rays of light beams incident on the imaging device in the first position in which the infrared ray cut filter is inserted in the imaging region by the second motor, and
   the polarization filter that is adapted to transmit the polarization component of light beams incident on the imaging device in the second position in which the polarization filter is inserted in the imaging region by the second motor.

8. The camera apparatus according to claim 1, wherein positions of the polarization filter and the infrared ray cut filter relative to the idler pulley do not change while the second motor translates the infrared ray cut filter together with the polarization filter and the idler pulley.

* * * * *